United States Patent Office 3,533,957
Patented Oct. 13, 1970

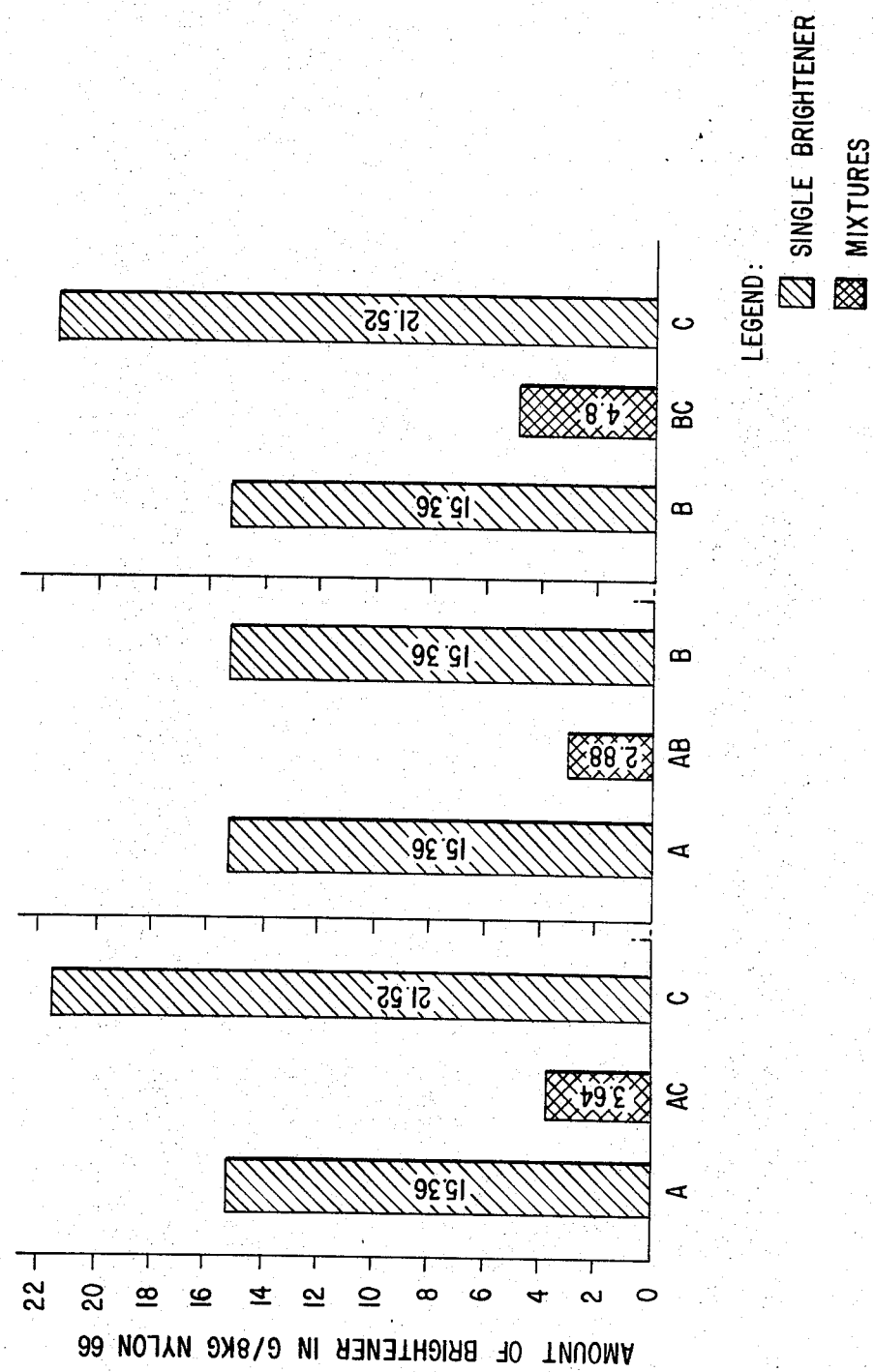

3,533,957
PYRAZOLINE OPTICAL BRIGHTENERS
Heinrich Hausermann, Riehen, and Siegfried Rosenberger, Munchenstein, Basel-Land, Switzerland, assignors to Geigy Chemical Corporation, Greenburgh, N.Y., a corporation of Delaware
Application Nov. 12, 1965, Ser. No. 507,309, now Patent No. 3,357,988, which is a continuation-in-part of application Ser. No. 386,080, July 21, 1964. Divided and this application May 4, 1967, Ser. No. 647,284
Claims priority, application Switzerland, May 27, 1964, 6,917/64; June 28, 1965, 9,021/65
Int. Cl. C09k 1/02
U.S. Cl. 252—301.2         12 Claims

ABSTRACT OF THE DISCLOSURE

Optical brighteners especially for textile materials made from synthetic polyamide or cellulose ester fibers and detergents for laundering such fibers are selected from 2,3-diphenyl pyrazolines of the formulae:

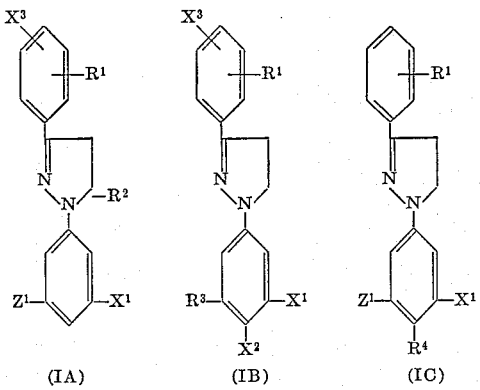

(IA)    (IB)    (IC)

wherein $R^1$, $R^2$, $R^3$, $R^4$, $X^1$, $X^2$, $X^3$ and $Z^1$ are as defined in the specification and mixtures of such compounds with each other and with the compound of the formula:

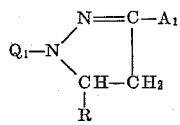

wherein $A_1$, R and $Q_1$ are as defined in the specification. Synergistic brightening results are obtained when using mixtures of two or more of different compounds defined by the formulae.

CROSS REFERENCES TO RELATED APPLICATIONS

The present application is a divisional application of copending application Ser. No. 507,309 filed Nov. 12, 1965, now U.S. 3,357,988 which in turn is a continuation-in-part application of Ser. No. 386,080 filed July 21, 1964, now abandoned.

This invention relates to novel pyrazoline optical brighteners. It further relates to the use of these new optical brighteners for the optical brightening of polyamide textile fiber materials, and to brightening compositions usable therefor, which contain the novel pyrazoline brighteners as active ingredients.

It is well known that, in the laundering of white textile materials made from synthetic polyamide or cellulose ester fibers, wash liquors are preferred which contain an effective amount of an optical brightener of the pyrazoline class. Since these brighteners draw from a neutral to alkaline bath, they are particularly well suited for the laundering of the aforesaid textile materials, and impart to them a desirable "whiter" appearance.

The "white" color thus achieved should be ideally a "neutral" white free from faint yellowish hues; (corresponding to value of about 96 on the Hunter scale) and with increasing amounts of fluorescent light which may have a faint bluish to blue-violet hue (Hunter values above 96 up to about 120 and higher), while greenish, yellowish, pinkish or excessively purplish hues are considered undesirable by a substantial section of the public.

As a second requirement, the optical brighteners to be used in the laundering of the above-mentioned textile materials must draw satisfactorily on the fibers of which these materials consist, also at low temperatures (20–40° C.).

Hitherto, optical brighteners of the pyrazoline class which offer the best available results in an attempt to fulfill these two fundamental requirements, are those which contain phenyl substituents in 1- and 3-position of the pyrazoline ring, or also a third phenyl ring in 5-position, and which are substituted at the phenyl ring in 1-position by —$SO_3H$, —COOH, sulfamyl, alkoxy-carbonyl or alkyl-sulfonyl groups, and/or in the phenyl ring in 3-position by halogen, especially chlorine in p-position.

In particular, the introduction of a chlorine atom in p-position at the 3-phenyl ring has been recommended in order to improve the drawing power of the aforesaid pyrazolines from a neutral to medium to strong alkaline bath, and thus to fulfil better the second one of the two aforesaid requirements.

It is also required of modern detergents containing brighteners that they be sufficiently stable to undergo no discoloration when exposed to heat (200–300°) for a short time. This occurs in manufacturing detergent powders from an aqueous slurry which is dried in a spray tower, the powder being sprayed through a heating zone having the above temperature range.

Generally, however, all of the aforesaid substituents at the phenyl ring in 1-position lead to pyrazoline brighteners which fail to satisfy fully one or the other of the aforesaid requirements and/or afford launderings on textile materials as defined above, which lack light-fastness, which means, in the case of optically brightened textile materials, a loss of fluorescence and a noticeable yellowing with prolonged exposure to daylight.

In an attempt to overcome these various drawbacks, chlorine atoms have also been introduced into the phenyl ring in 1-position at the pyrazoline ring, and, more particularly, the compound of the formula

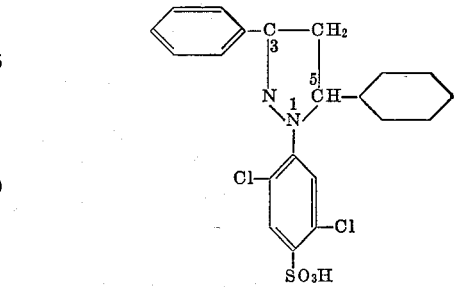

has been recommended, together with others bearing a —$SO_3H$ or hydrocarbon, hydroxy, hydroxyalkyl, amino, acylamino, —COOH or —CN group as particularly suitable for the improvement of textile materials in general, by "killing" a yellow or brown tinge of allegedly white textile materials, and thereby enhancing their apparent whiteness.

However, the compound of the above formula fails to draw from a neutral or alkaline bath as it is required in the laundering of the above-defined textile materials, especially those of synthetic linear polyamide fibers or cellulose ester fibers, and elimination of the —SO₃H group does not improve the drawing power sufficiently to make the resulting compound practically useful.

On the other hand, introduction of a chlorine atom in p-position at the 1-phenyl ring, analogous to the recommended position of such atom at the 3-phenyl ring, improves the drawing power of the resulting compound, but such compounds suffer from another serious drawback, namely a pronounced undesirable greenish tinge. Upon repeated washing of textile materials of the type described with wash liquors containing such brightening pyrazolines, there occurs what is known as "build-up" of the brightener on the fibers, i.e. the amount of brightener drawn on the fiber increases with each washing. Such build-up leads, in the case of 1-(p-chloro-phenyl)-3-phenyl or 3,5-diphenylpyrazoline brighteners, to an increasingly stronger green discoloration of the laundered goods.

More recently, a further requirement has arisen among a significant proportion of the public, namely, that detergent compositions such as soaps, wash powders, and the like which are used in the laundering of textile materials, have a preferably perfectly white appearance, which is preserved when such compositions are stored even under severe climatic conditions of humidity and/or temperature.

Among the above-enumerated pyrazoline brighteners, some that are in many respects very satisfactory, especially those which contain an unsubstituted or hydrocarbon-substituted sulfamyl group at the 1-phenyl ring, preferably in p-position to the pyrazolinyl nucleus, fail to satisfy the last-mentioned requirement, and cause a yellowing of detergent compositions containing the same, especially when such compositions also contain sodium perborate and when they are stored in a humid atmosphere at temperatures in the order of 25 to 40° C. (about 75° to 105° F.).

It is, therefore, an object of this invention to provide 1,3-diphenyl-pyrazoline brighteners which satisfy all of the requirements described hereinbefore and are free from the above-mentioned drawbacks.

It has been found that, unexpectedly, this object is fulfilled by the 2,3-diphenyl pyrazolines of the Formulas IA, IB and IC shown below, which compounds are characterized by the presence, at the 1-phenyl ring in m-position to the pyrazolinyl nucleus, of a halogen atom of one of the atomic numbers 9, 17 and 35, and which compounds are further substituted as shown by the aforesaid formulas, namely

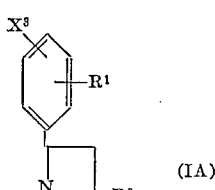
(IA)

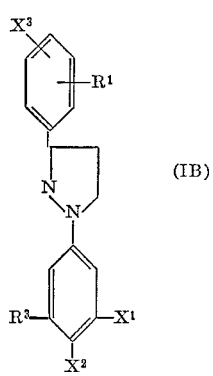
(IB)

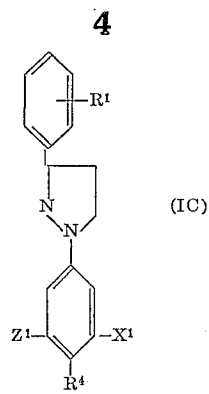
(IC)

wherein

R¹ represents hydrogen, from 1 to 2 lower alkyl substituents, from 1 to 2 lower alkoxy substituents, or lower alkoxycarbonylamino or lower alkanoylamino;

each of R² and R³ represents, independently of the other, hydrogen or lower alkyl;

R⁴ represents lower alkyl;

each of X¹ and X² represents, independently of the other, chlorine, fluorine or bromine, trifluoromethyl;

each of X³ and Z¹ represents, independently of the other, hydrogen, fluorine, chlorine or bromine.

The new pyrazoline brighteners of Formulas IA, IB and IC satisfy all of the requirements made on such brighteners in the laundering of synthetic polyamide and cellulose ester fiber textile materials, they draw at a satisfactory rate on these fibers from a neutral or alkaline bath, impart to the fabrics washed therewith a neutral white appearance which does not shift to undesirable tinges even in higher concentrations, even when these are accumulated by repeated washings due to the so-called build-up effect. Furthermore, the whiteness of the textile materials treated with the compounds of Formula IA, IB or IC, is fast to light for a satisfactory length of time; detergents having conventional contents of sodium perborate and, at the same time, contain brighteners of Formula IA, IB or IC, have a perfect white appearance which they retain even after prolonged storage under standard aging conditions, especially at high humidity and temperatures in the order of 25 to 40° C.

The above-defined substitutions of the two phenyl rings, in 1- and 3-position at the pyrazolinyl nucleus is critical for obtaining the desired combination of advantageous properties in the brighteners of Formulas IA, IB and IC. If, for instance, an acylamino substituent or alkyl substituent is present in p-position to the pyrazolinyl nucleus at the phenyl ring of the 1-position, then white textile goods laundered with a liquor containing such brightener show an undesirable, strong greenish tinge. A similar deterioration of the fluorescence properties occurs when a halogen atom is introduced into the phenyl ring in 3-position at the pyrazolines of Formula IC.

Novel compounds the formula of which corresponds to Formulas IA, IB and IC, except that in lieu of R² they bear a phenyl ring in 5-position at the pyrazolinyl nucleus, are of considerably weaker fluorescence, while they are otherwise of similarly good properties in laundering, and especially of very good light fastness.

If three halogen atoms are introduced at the phenyl nucleus in 1-position of the pyrazolinyl nucleus, compounds are obtained the fluorescence of which is too weak for practical use as optical brighteners for the purpose set forth hereinbefore.

Optical results are obtained with those compounds falling under Formulas IA and IB in which Z¹ and R², respectively, are hydrogen atoms. Second best results are obtained with the compounds of Formula IC in which Z¹ represents hydrogen.

The term "lower" used in connection with "alkyl", "alkoxy" or "alkanoyl" in this specification and in the appended claims means that the aforesaid radicals have not more than 4 carbon atoms.

The compounds of Formulas IA, IB and IC as well as other novel optical brighteners which fall under the formula

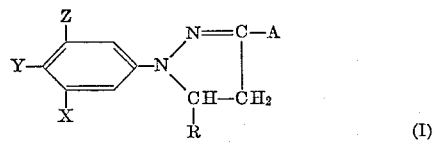

in which formula, as well as in Formulas II and III given further below,

X represents halogen or the trifluoromethyl group,
Y represents hydrogen, halogen, the trifluoromethyl group or a lower alkyl group,
Z represents hydrogen, halogen or a lower alkyl group,
R represents hydrogen, a lower alkyl group or a carboxylic-aromatic or heterocyclic-aromatic radical which is unsubstituted or substituted by a non-ionogenic and non-coloring substituent and
A a phenyl radical which is unsubstituted or substituted by a non-ionogenic and non-coloring substituent, are obtained by reacting a phenyl hydrazine of the formula

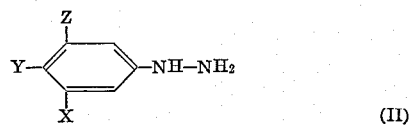

with a vinyl ketone of the formula $$R\text{—}CH\text{=}CH\text{—}CO\text{—}A \qquad (III)$$

or with a similarly reacting ketone of the formula

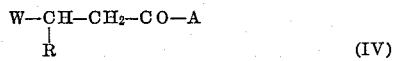

in which W represents chlorine, bromine or a tertiary amino group.

When R is a carboxylic-aromatic radical it represents preferably the phenyl radical; if it symbolizes a heterocyclic-aromatic radical, it represents e.g. the furyl or thienyl radical.

Non-ionogenic and non-coloring substituents usable in the carboxylic-aromatic radical R as well as in the phenyl radical A are in the first place halogens, such as fluorine, chlorine or bromine, and lower alkyl and lower alkoxy groups or acyl-amido groups, in particular carbacyl-amido groups, e.g. low alkanoyl-amido or alkoxy-carbonyl-amido groups with a preferably lower alkoxy radical.

When W represents tertiary amino groups, it means in particular a di-lower alkylamino group, preferably the dimethylamino group.

Compounds of the Formula I in which X represents chlorine, Y, Z, and R each represent hydrogen and A represents the phenyl or the p-chlorophenyl group are preferred because of their relatively easy accessibility and their good fluorescence properties.

The phenyl hydrazines of Formula II which can be used as starting materials are obtained by conventional reduction methods from the diazonium salts of correspondingly substituted anilines.

Starting materials of Formula III can be prepared for instance by condensation of a ketone of the formula $CH_3CO\text{—}A$ with an aldehyde of the formula $R\text{—}CH\text{=}0$.

Starting materials of Formula IV, in which W represents chlorine or bromine, are prepared, e.g., by condensation of an acid chloride of the formula

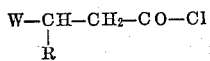

such as β-chloro- or β-bromo-propionic acid chloride with the desired aryl compound A—H according to Friedel-Crafts; starting materials of Formula IV in which W represents a tertiary amino group are produced, for instance, from corresponding methyl-arylketones, aldehydes, in particular formaldehyde and from secondary amines, in particular dimethyl-amine, according to the method devised by Mannich.

Pyrazoline compounds of Formula I in which R does not represent hydrogen but a lower alkyl group, and in particular a carbocyclic-aromatic or heterocyclic-aromatic radical which is unsubstituted or substituted by non-ionogenic and non-coloring substituents are preferably produced from vinyl ketones of Formula III whereas pyrazolines of the Formula I in which R represents hydrogen are preferably produced by using a ketone of Formula IV.

The reaction of the phenyl hydrazine of Formula II with the ketone of Formula III or IV is carried out according to methods known per se, preferably at elevated temperatures and in an organic or aqueous-organic solution, the organic portion of the solution preferably consisting of lower alcohols such as methanol, ethanol, butanol or ethylene-glycol-mono-lower alkyl ether.

The use of the vinyl ketones of Formula III as starting materials requires the presence of at least catalytical amounts of acids. Acids suitable for this purpose are inorganic acids, such as hydrohalic acids, e.g. hydrochloric, hydrobromic acid or sulfuric acid as well as organic acids, such as acetic acid. When (β-chloro- or bromo-alkyl)-phenyl-ketones of Formula III are used as starting materials, acid-binding agents are necessary. Compounds suitable for this purpose are for instance organic tertiary nitrogen bases, in particular pyridine. When (β-tert-amino-alkyl)-phenyl-ketones of Formula III are used as starting materials, the presence of alkaline materials, such as alkali hydroxides -carbonates, -bicarbonates or -acetates is recommended.

Generally, the reaction takes place without difficulties and under mild conditions and affords a good yield (70% and higher) of final products.

The pyrazoline compounds according to the invention are almost colorless to faintly yellow substances, of low or practically no solubility in hot water, which crystallize very well. They dissolve in organic solvents, such as alkanols, lower fatty acids, lower fatty acid esters, lower ketones and in optionally halogenated aromatic hydrocarbons. The practically colorless organic solutions have a vivid violet to blue fluorescence.

The pyrazoline compounds according to the invention are suited for the optical brightening of high-molecular organic material, in particular synthetic organic polyplastics, i.e. plastics produced by polymerization, polycondensation or polyaddition, such as polyolefins, e.g. polyethylene or polypropylene, furthermore polyvinyl chloride, polyacrylonitrile and its copolymers, polyamides and cellulose esters.

Optical brightening of the high-molecular organic material is effected e.g. by incorporating therein small amounts of the optical brightener of the invention, preferably 0.001 to 0.3% based on the material to be brightened and optionally in combination with other substances, such as plasticizers, pigments and the like. Depending on the nature of the material to be brightened, the brightener is dissolved in the monomers prior to polymerization, in the polymeric material or, together with the polymer, in the solvent. The material pretreated in this manner is then given the desired final form by processes known per se, such as calendering, pressing, extrusion moulding spreading, casting or injection moulding.

Preferably however, high-molecular organic material is brightened in fibrous form, for instance in the form of fibers from polyamide, polyacrylonitrile and its copolymers, or cellulose esters, such as cellulose acetates. For brightening these fiber materials, the pyrazolines according to the invention are preferably used in an aqueous dispersion. Such a brightening dispersion contains preferably from 0.01 to 0.2%, calculated on the weight of the fiber material to be brightened, of a pyrazoline according to the invention. In addition, it can contain auxiliary agents, such as dispersing agents, e.g. condensation products of fatty acid alcohols having from 10 to 18 carbon atoms with 15 to 25 mol. of ethylene oxide or condensation products of alkyl monoamines or polyamines having from 16 to 18 carbon atoms with at least 10 mol. of ethylene oxide and, if a polymeric or copolymeric acrylonitrile fiber material is brightened, also acids, in particular organic acids such as acetic acid, oxalic acid and preferably formic acid.

Brightening of the fiber material with the aqueous brightening dispersion is performed either in the exhaust process at temperatures of preferably from 60 to 100° C. or in the padding process. In the latter case, the goods are impregnated with the brightening dispersion and are finished e.g. by steaming at 70 to 100° C. with preferably saturated neutral steam. The finished fiber material is finally rinsed and dried. The fibers are preferably brightened by the exhaustion method, i.e. from a long bath.

High-molecular organic material optically brightened according to the invention, and in particular synthetic fiber material brightened according to the exhaustion method, has a pleasant, pure white appearance of bluish fluorescence.

The pyrazoline according to the invention can also be used to optically brighten detergents, such as soaps, soluble salts of higher fatty alcohol sulfates, higher and/or poly-alkyl-substituted aryl-sulfonic acids, sulfonated hydrocarbon carboxylic acid esters of medium or higher alkanols, higher alkanoyl-amino-alkyl or -aminoaryl-carboxylic acids or -sulfonic acids or their fatty acid glycerin sulfates; furthermore non-ionogenic detergents such as higher alkyl phenol polyglycol ethers. Such detergents containing pyrazolines of Formula I and especially those of Formulas IA, IB and IC can also be used for the brightening of textile materials.

Detergents brightened according to the invention can contain the usual filters and auxiliary agents such as alkali-polymetaphosphate and polymetaphosphate, alkali metal silicates, alkali metal borates, alkali metal salts of carboxymethyl celluloses, foam-stabilizing agents such as alkanolamides of higher fatty acids or complexones such as soluble salts of ethylene diamine tetracetic acid.

The pyrazolines according to the invention are incorporated in detergents or in wash liquors, preferably as solutions in neutral water-miscible and/or highly volatile organic solvents such as lower alkanols, lower alkoxyalkanols or lower aliphatic ketones.

Furthermore, they can be used per se in finely divided solid form or in a mixture with dispersing agents. They can, for instance, be mixed, kneaded or ground with the detergents and then be blended with the usual auxiliary agents and fillers. The brightening agents are, for instance, pasted together with detergents, conventional auxiliary agents, fillers and water, and the resulting paste is then dried in a spray tower. The pyrazoline derivatives according to the invention can also be admixed with finished laundering agents, e.g. by spraying a solution in a highly volatile and/or water-soluble organic solvent onto the dry laundering agents which are stirred.

The amount of optical brightening agent of Formula I present in a detergent composition can be up to 1% by weight, but is preferably from 0.001 to 0.5% based on the solid content of the detergent. Such detergents containing the optical brightener of Formula I and particularly those of Formula IA, IB or IC, in the preferred amounts have a pure white appearance in day light.

When used for the washing of textile fibers such as synthetic polyamide and cellulose ester fiber, wash liquors containing the pyrazolines according to the invention impart to these fibers a brilliant appearance in day light. They can, therefore, in particular be used for the washing of these synthetic fibers or of textiles, textile components and laundry consisting of such fibers. For household use, they can also contain further optical brightening agents with an affinity to other fibers such as cellulose.

The term "pyrazoline" as used in this specification and the appended claims means "$\Delta^2$-pyrazoline."

The brightening of the detergent compositions according to the invention due to presence therein of the above described novel brighteners is very helpful in detecting irregularities in the production of these compositions which usually become immediately noticeable by discoloration.

Another aspect of the present invention relates to novel mixed optical brighteners, to the use of such brighteners for the production of special white effects on textile materials especially on such materials made of synthetic polyamide fibers, and to such fibers brightened with the said mixed brighteners.

We have found that the amount of optical brightener deposited by treatment in brightening liquors on textile fibers, and especially on synthetic polyamide fibers cannot be increased at random, but that at a certain amount, dependent on the individual nature and structure of each brightener compound, a maximal white effect is attained.

This amount is referred to hereinafter as the "critical amount."

If amounts exceeding this critical amount of optical brightener are deposited on the said fiber materials, then the fibers do not appear "whiter" to the average human eye, than the fibers containing the critical amount of brightener, but achieve at best only the same maximal white effect as has been achieved by the critical amount, or, in many cases, an inferior white effect is achieved, inferiority being due to dulling, or to greenish, reddish or yellowish coolor hues appearing in the white. Only bluish or blue-purple are desirable, which are largely a result of increased blue fluorescence.

Surprisingly, mixed brighteners according to this aspect of the invention afford such desired blue to blue-purple hues, even where their individual components show undesirable hues upon being applied in increased brightener-to-goods ratios.

Moreover, and most unexpectedly, we have found that mixed brighteners need only be used in amounts of one-half and even less of the amount required of the individual brightener compounds in order to attain on synthetic polyamide fibers the same whiteness level, especially a "neutral white" corresponding to a value of about 96 on the Hunter scale.

A first class of such advantageous mixed brighteners consists of mixtures of at least two pyrazolines according to Formulas IA, IB and IC which can be in the form of purely mechanical mixtures of the individual components or in the form of actual crystal compounds the crystal structure of which is different from that of the individual components. Such mixtures can be produced on the one hand by dry mixing, melting or recrystallizing together the individual components. On the other hand, the desired pyrazoline mixtures can be obtained by using a starting material which is already in the form of a mixture, e.g. by reacting a hydrazine falling under Formula II, the substitution of which preferably corresponds to that of Formula IA, IB or IC with a ketone mixture of the formulae

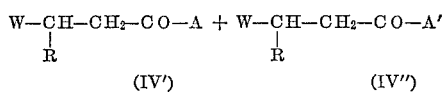

wherein W and R have the same meaning as in Formula IV and A and A' represent two different radicals of those defined above under A. Those mixtures which contain pyrazolines with and without halogen in the phenyl nucleus in the 3-position are particularly advantageous. The 3-(4″-halogenophenyl)derivatives fluoresce blue to blue-greenish whilst the products without halogen in the 3-phenyl nucleus fluoresce violet to blue.

Valuable mixtures are, for example:

1-(3'-chlorophenyl)-3-(4''-chlorophenyl)-pyrazoline, admixed with the following pyrazolines:
1-(3'-chlorophenyl)-3-phenyl-pyrazoline,
1-(3'-chlorophenyl)-3-(4''-methoxyphenyl)-pyrazoline,
1-(3'-chlorophenyl)-3-(2'',5''-dimethoxyphenyl)-pyrazoline,
1-(3'-chlorophenyl)-3-(4''-acetylaminophenyl)-pyrazoline,
1-(3'-chlorophenyl)-3-(4''-methylphenyl)-pyrazoline.

When either X or Y or Z in Formulas I and IV is halogen, then it is chiefly fluorine, chlorine or bromine. If Y or Z or R is a lower alkyl group then this has preferably 1 to 4 carbon atoms.

As a carbocyclic-aromatic radical, R is preferably the phenyl radical; as heterocyclic-aromatic radical it is, for example, the furyl or thienyl radical.

The principal non-ionogenic and non-color imparting substituents in carbocyclic-aromatic radical R as well as in the phenyl radical A are halogens such as fluorine, chlorine or bromine, lower alkyl and lower alkoxy groups or acylamido groups, i.e. carbacylamido, e.g. lower alkanoylamido groups or alkoxycarbonylamido groups, preferably containing a lower alkoxy radical.

When W represents tertiary amino groups, it is especially a di-lower alkylamine group, preferably the dimethylamino group.

Compounds of Formula I wherein X is chlorine, each of Y, Z and R represents hydrogen and A represents the phenyl or p-chlorophenyl group are preferred because of their relatively easy accessibility and their good fluorescence properties.

A second class of advantageous mixed brighteners according to the second aspect of this invention consists of 1 or several compounds of the formula

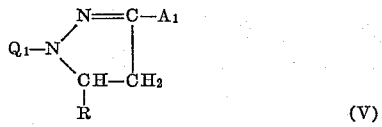

(V)

wherein $Q_1$ is a phenyl radical which is unsubstituted at the ring carbon atoms in ortho-position to the ring carbon atom which is linked to the pyrazoline ring in the Formula V and is substituted in one meta-position by fluorine, chlorine, bromine or trifluoromethyl and which is substituted in the other meta-position and in the para-position or is substituted in one or both of these latter positions by non-ionogenic or non-chromogenic substituents, R has the same meaning as in Formulas III and IV, supra, and represents hydrogen, lower alkyl or a preferably mononuclear carbocyclic aromatic or heterocyclic-aromatic radical which is unsubstituted or substituted by non-ionogenic, non-chromogenic substituents, e.g. phenyl, furyl or thienyl, $A_1$ represents a phenyl radical which is unsubstituted or contains non-ionogenic, non-coloring groups as the only substituents; but preferably one or several of the compounds of Formula IA, IB or IC, and one or several compounds of the formula

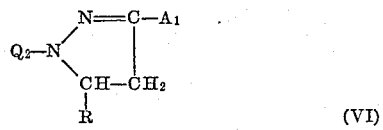

(VI)

wherein $Q_2$ represents a phenyl radical which is unsubstituted at the ring carbon atoms in ortho-position to the ring carbon atom which is linked to the pyrazoline ring in Formula VI, which is substituted in para-position to the last mentioned ring carbon atom with a non-ionogenic, non-coloring, electron-attracting substituent, and both meta-positions of which are unsubstituted or one or both of which meta-positions are occupied by lower alkyl; and $A_1$ ond R have the same meanings as in Formula V.

Preferred mixed brighteners falling under this last described class are those in which the component or components of Formula V contain as radical $Q_1$ the grouping

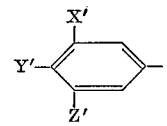

wherein
X' represents fluorine, chlorine or trifluoromethyl,
Y' represents hydrogen, lower alkyl, or a non-ionogenic, non-coloring, electron-attracting substituent, especially fluorine, chlorine, bromine, trifluoromethyl, carboxyl, carboxyl esterified with alkyl or aryl groups, sulfonic acid alkyl or aryl ester groups, unsubstituted or substituted lower alkyl sulfonyl groups, unsubstituted or N-substituted sulfamoyl groups or the cyano group, and
Z' represents hydrogen, fluorine, chlorine, bromine or lower alkyl, but preferably, a compound or compounds falling under Formulas IA, IB and/or IC and in which the component or components of Formula VI contain as radical $Q_2$ the grouping

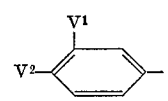

wherein
$V^1$ represents lower alkyl or, preferably, hydrogen and
$V^2$ represents trifluoromethyl, a free or esterified carboxy group, a sulfonic acid ester group, an unsubstituted or substituted lower alkyl-sulfonyl group, an unsubstituted or N-substituted sulfamyl or carbamyl group or the cyano group.

Esterified carboxyl groups present as substituents Y' or $V^2$ are especially lower alkoxy-carbonyl groups, hydroxy-lower alkoxy-carbonyl groups, lower alkoxy-lower alkoxy-carbonyl groups or N-substituted in particular, N-lower alkyl-substituted tertiary amino-lower alkoxy-carbonyl groups.

Sulfonic acid ester groups present as substituent Y' or $V^2$ are especially sulfonic acid aryl, preferably mononuclear six-membered carbocylic aryl ester groups and, in particular sulfonic acid phenyl ester groups.

Substituted lower alkyl sulfonyl groups present as substituent Y' or $V^2$ are especially hydroxy-lower alkyl sulfonyl groups or lower alkoxy-lower alkyl-sulfonyl groups.

N-substituents of sulfamoyl or carbamoyl groups represented by Y' and $V^2$ are especially aliphatic groups, e.g. lower alkyl, hydroxy-lower alkyl, lower alkoxy-lower alkyl and N,N-di-lower alkylamino-lower alkyl groups.

Non-ionogenic, non-chromogenic substituents which can be present in the radicals $A_1$, $A_2$, and R, are those mentioned hereinbefore in connection with Formulas I to IV inclusive.

Because they are readily available, and because of their very satisfactory fluorescence properties, the compounds of Formulas IA, IB and IC, and especially 1-(3'-chlorophenyl)-3-phenyl-pyrazoline and 1-(3'-chlorophenyl)-3-(4''-chlorophenyl)-pyrazoline are preferred as the component falling under Formula V in the mixed brighteners of the invention pertaining to the second above-mentioned class.

These mixed brighteners can be produced by the same methods as have been described hereinbefore for the production of the mixed brighteners of the first-mentioned class.

Especially valuable mixed brighteners pertaining to the second class are those consisting of the following components:

(1) 1-(3'-chlorophenyl)-3-phenyl-pyrazoline and 1-(4'-methoxycarbonyl-phenyl)-3-(4''-chlorophenyl)-pyrazoline
(2) 1-(3'-chlorophenyl)-3-(4''-chlorophenyl-pyrazoline and 1-(4'-methoxycarbonyl-phenyl)-3-(4''-chlorophenyl)-pyrazoline
(3) 1-(3'-chlorophenyl)-3-(4''-chlorophenyl)-pyrazoline and 1-(4'-sulfamoylphenyl)-3-(4''-chlorophenyl) pyrazoline
(4) 1-(3'-chlorophenyl)-3-phenyl-pyrazoline and 1-(4'-sulfamoylphenyl)-3-(4''-chlorophenyl)-pyrazoline
(5) 1-(3'-chlorophenyl)-3-(4''-chlorophenyl)-pyrazoline and 1-(4'-methoxycarbonyl-phenyl)-3-phenyl-pyrazoline
(6) 1-(3'-chlorophenyl)-3-phenyl-pyrazoline and 1-(4'-ethoxycarbonyl-phenyl)-3-(4''-chlorophenyl)-pyrazoline
(7) 1-(3'-chlorophenyl)-3-(4''-chlorophenyl)-pyrazoline and 1-(4'-methylsulfonyl-phenyl)-3-(4''-chlorophenyl)-pyrazoline
(8) 1-(3'-chlorophenyl)-3-(4''-chlorophenyl)-pyrazoline and 1-(4'-methylsulfonylphenyl)-3-phenyl-pyrazoline
(9) 1-(3'-chlorophenyl)-3-(4''-propionylaminophenyl) pyrazoline and 1-(4'-methylsulfonylphenyl)-3-(4''-chlorophenyl)-pyrazoline.

The two components in each of these mixtures are present in weight ratios ranging from 1:3 to 3:1, and preferably in ratios of about 1:1 to 1:2.

Mixed brighteners in which the components are present in weight ratios within the range of 9:1 to 1:9 still show noticeable superiority of whitening over the individual components.

Both above-mentioned classes of mixed optical brighteners according to the invention are almost colorless to slightly yellowish compounds which are very slightly soluble or almost insoluble in water. They are soluble in organic solvents such as lower alkanols, lower fatty acids, alkanol esters of lower fatty acids, lower fatty acid amides, lower ketones and also in halogenated aromatic hydrocarbon solvents to form colorless organic solutions of vivid violet to blue fluorescence. The mixed brighteners can be crystallized, e.g. from such organic solutions.

The mixed brighteners according to the invention are useful for the brightening or whitening of the materials mentioned hereinbefore in connection with the optical brighteners of Formulas IA, IB and IC. They are generally much more economical than the latter since they permit attainment of the same degrees of whiteness with much smaller amounts of brightening agent. Moreover, they impart desired bluish to blue-violet hues to the higher degrees of white (above value 96 on the Hunter scale) where the individual components show purple, reddish or greenish hues.

The amounts of the mixed brighteners applied to materials to be brightened therewith can be as low as 0.001% by weight calculated on the weight of the substrate.

Application methods are the same as those described in connection with the optical brighteners according to the first aspect of this invention.

Modern detergents, especially synthetic non-soap detergents can be given a whiter, more attractive aspect by incorporating mixed optical brightener according to the invention thereinto, preferably in amounts above 0.001% and as high as 1.5% by weight calculated on the solids content of the detergent.

The superior whitening effects of the mixed brighteners can also be achieved, at least in part, by adding the individual components thereof separately to the same wash liquor.

The novel mixed brighteners can also be incorporated into detergents together with other optical brighteners which draw specifically on such cellulosic textile materials as cotton or on other non-polyamide fibers.

The invention is further illustrated by the following non-limitative examples. Temperatures are given therein in degrees centigrade. Percentages and parts are given by weight unless expressly stated otherwise.

EXAMPLE 1

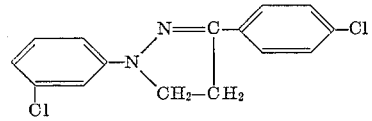

19.7 grams (g.) of 3-chlorophenyl hydrazine hydrochloride are dissolved in a mixture of 300 milliliters (ml.) of ethanol and 100 ml. of water. The solution is mixed with 30 g. of sodium carbonate and heated to 70 to 80°. At this temperature, a solution of 25 g. of ($\beta$-dimethyl-aminoethyl) - (4-chlorophenyl)-ketone-hydrochloride in 100 ml. water is added dropwise during 1 hour while stirring. Then the reaction mixture is refluxed for about 14 hours while stirring well, whereupon it is cooled. The precipitate is separated by filtration, washed until the washing water does no longer show an alkaline reaction, and finally dried.

28 g. of 1 - (3' - chlorophenyl)-3-(4''-chlorophenyl)-pyrazoline corresponding to 96.5% of the theory calculated in the initial amount of ($\beta$-N,N-dimethylamino-ethyl) - (4 - chloro-phenyl) - ketone, are obtained as a yellowish crystalline powder having a melting point of 121–122° (uncorrected). By recrystallization from ethanol, this pyrazoline is obtained in analytically pure form as pale yellow crystals. This product has a deep blue to blue-violet fluorescence in organic solvents. It is suitable for the optical brightening of synthetic polyamide fiber material.

When the 19.7 g. of 3-chlorophenyl hydrazine hydrochloride are replaced by equivalent amounts of the hydrochloride of one of the phenyl hyrdazines listed in column II of the following table and the 25 g. of ($\beta$-dimethyl-amino-ethyl)-(4-chloro-phenyl)-ketone hydrochloride are replaced by corresponding amounts of the hydrochloride of one of the $\beta$-tert-amino-alkyl phenyl ketones mentioned in column III while all other conditions are the same as described in Example 1, the corresponding final products having the melting points as listed in column IV of the table are obtained.

| I No. | II Phenylhydrazine | III ($\beta$-tert-amino-alkyl)-(phenyl)-ketone | IV M.P.,° |
|---|---|---|---|
| 2 | 3-Cl-C$_6$H$_4$-NHNH$_2$ | CH$_3$O-C$_6$H$_4$-COCH$_2$CH$_2$N(CH$_3$)$_2$ | 120–121 |
| 3 | Same as above | CH$_3$-C$_6$H$_4$-COCH$_2$CH$_2$N(CH$_3$)$_2$ | 102–104 |

| No. | Phenylhydrazine | (β-tert-amino-alkyl)-(phenyl)-ketone | M.P.,° |
|---|---|---|---|
| 4 | ....do.... | CH$_3$O–C$_6$H$_3$(OCH$_3$)–COCH$_2$N(CH$_3$)$_2$ | 73–75 |
| 5 | ....do.... | (2,5-(OCH$_3$)$_2$)C$_6$H$_3$–COCH$_2$CH$_2$N(CH$_3$)$_2$ | 86–87 |
| 6 | 4-F-C$_6$H$_4$–NHNH$_2$ | C$_6$H$_5$–COCH$_2$CH$_2$N(CH$_3$)$_2$ | 152–154 |
| 7 | 4-Br-C$_6$H$_4$–NHNH$_2$ | Same as above | 91–92 |
| 8 | Same as above | Cl–C$_6$H$_4$–COCH$_2$CH$_2$N(CH$_3$)$_2$ | 119–120 |
| 9 | ....do.... | (2,5-(OCH$_3$)$_2$)C$_6$H$_3$–COCH$_2$CH$_2$N(CH$_3$)$_2$ | 91–92 |
| 10 | 3-CH$_3$-4-Cl-C$_6$H$_3$–NHNH$_2$ | C$_6$H$_5$–COCH$_2$CH$_2$N(CH$_3$)$_2$ | 124–125 |
| 11 | 3,4-Cl$_2$-C$_6$H$_3$–NHNH$_2$ | Cl–C$_6$H$_4$–COCH$_2$CH$_2$N(CH$_3$)$_2$ | 147–148 |
| 12 | 3,5-Cl$_2$-C$_6$H$_3$–NHNH$_2$ | C$_6$H$_5$–COCH$_2$CH$_2$N(CH$_3$)$_2$ | 139–140 |
| 13 | Same as above | Cl–C$_6$H$_4$–COCH$_2$CH$_2$N(CH$_3$)$_2$ | 160–161 |
| 14 | 3-CF$_3$-C$_6$H$_4$–NHNH$_2$ | Same as above | 113–114 |
| 15 | Same as above | Br–C$_6$H$_4$–COCH$_2$CH$_2$N(CH$_3$)$_2$ | 122–124 |
| 16 | 3-Cl-4-CF$_3$-C$_6$H$_3$–NHNH$_2$ | Cl–C$_6$H$_4$–COCH$_2$CH$_2$N(CH$_3$)$_2$ | 91–92 |
| 17 | 3-F-C$_6$H$_4$–NHNH$_2$ | Same as above | 131–132 |
| 18 | HOOC–(3-Cl)C$_6$H$_3$–NHNH$_2$ | ....do.... | [1] 257 |
| 19 | CH$_3$OOC–(3-Cl)C$_6$H$_3$–NHNH$_2$ | ....do.... | 152–145 |

| No. | Phenylhydrazine | (β-tert-amino-alkyl)-(phenyl)-ketone | M.P., ° |
|---|---|---|---|
| 20 | 3-Cl-C$_6$H$_4$-NHNH$_2$ | CH$_3$CONH-C$_6$H$_4$-COCH$_2$CH$_2$N(CH$_3$)$_2$ | 219–21 |
| 21 | Same as above | CH$_3$OCONH-C$_6$H$_4$-COCH$_2$CH$_2$N(CH$_3$)$_2$ | 163–164 |
| 22 | do | C$_2$H$_5$OCONH-C$_6$H$_4$-COCH$_2$CH$_2$N(CH$_3$)$_2$ | 155–56 |
| 23 | 3-CF$_3$-C$_6$H$_4$-NHNH$_2$ | C$_6$H$_5$-COCH$_2$CH$_2$N(CH$_3$)$_2$ | 79–80 |
| 24 | Same as above | F-C$_6$H$_4$-COCH$_2$CH$_2$N(CH$_3$)$_2$ | 111–112 |
| 25 | 3,4-Br$_2$-C$_6$H$_3$-NHNH$_2$ | Cl-C$_6$H$_4$-COCH$_2$CH$_2$N(CH$_3$)$_2$ | 162–165 |
| 26 | 3,4-F$_2$-C$_6$H$_3$-NHNH$_2$ | Same as above | 155–156 |
| 27 | 3,4-Cl$_2$-C$_6$H$_3$-NHNH$_2$ | CH$_3$O-C$_6$H$_4$-COCH$_2$CH$_2$N(CH$_3$)$_2$ | 122–23 |
| 28 | 3-Br-4-Cl-C$_6$H$_3$-NHNH$_2$ | F-C$_6$H$_4$-COCH$_2$CH$_2$N(CH$_3$)$_2$ | 132–133 |
| 29 | 3-Cl-4-Br-C$_6$H$_3$-NHNH$_2$ | Br-C$_6$H$_4$-COCH$_2$CH$_2$N(CH$_3$)$_2$ | 148–149 |
| 30 | 3-Cl-4-F-C$_6$H$_3$-NHNH$_2$ | CH$_3$-C$_6$H$_4$-COCH$_2$CH$_2$N(CH$_3$)$_2$ | 97–98 |
| 31 | 3-F-4-Cl-C$_6$H$_3$-NHNH$_2$ | CH$_3$CONH-C$_6$H$_4$-COCH$_2$CH$_2$N(CH$_3$)$_2$ | 226–227 |
| 32 | 3,4-Cl$_2$-C$_6$H$_3$-NHNH$_2$ | C$_6$H$_5$-COCH$_2$CH$_2$N(CH$_3$)$_2$ | 127–29 |
| 33 | Same as above | CH$_3$CH$_2$OCONH-C$_6$H$_4$-COCH$_2$CH$_2$N(CH$_3$)$_2$ | 174–176 |
| 34 | 3-Br-4-CH$_3$-C$_6$H$_3$-NHNH$_2$ | CH$_3$-C$_6$H$_4$-COCH$_2$CH$_2$N(CH$_3$)$_2$ | 141–142 |
| 35 | 3-F-4-CH$_3$-C$_6$H$_3$-NHNH$_2$ | CH$_3$O-C$_6$H$_4$-COCH$_2$CH$_2$N(CH$_3$)$_2$ | 110–111 |

| I | II | III | IV |
|---|---|---|---|
| No. | Phenylhydrazine | (β-tert-amino-alkyl)-(phenyl)-ketone | M.P.,° |
| 36 | CH₃–[Br,Br-phenyl]–NHNH₂ | CH₃CONH–[phenyl]–COCH₂CH₂N(CH₃)(CH₃) | 228–229 |
| 37 | CH₃–[Cl,Cl-phenyl]–NHNH₂ | C₂H₅OCONH–[phenyl]–OCO₂CH₂N(CH₃)(CH₃) | 207–208 |
| 38 | Cl–[CH₃,Cl-phenyl]–NHNH₂ | Cl–[phenyl]–OCOH₂CH₂N(CH₃)(CH₂) | 164–165 |
| 39 | CH₃–[F,F-phenyl]–NHNH₂ | Same as above | 177–179 |
| 40 | [Cl-phenyl]–NHNH₂ | C₂H₅CONH–[phenyl]–COCH₂CH₂N(CH₃)(CH₃) | 203–204 |
| 41 | Same as above | n-C₃H₇CONH–[phenyl]–COCH₂CH₂N(CH₃)(CH₃) | 203–204 |
| 42 | do | C₆H₅CH₂OCNH–[phenyl]–COCH₂CH₂N(CH₃)(CH₃) | 223 |
| 43 | do | n-C₃H₇OOCNH–[phenyl]–COCH₂CH₂N(CH₃)(CH₃) | 150 |
| 44 | do | iso-C₃H₇OOCNH–[phenyl]–COCH₂CH₂N(CH₃)(CH₃) | 181–182 |
| 45 | do | n-C₄H₉OOCNH–[phenyl]–COCH₂CH₂N(CH₃)(CH₃) | 147–149 |
| 46 | do | iso-C₄H₉OOCNH–[phenyl]–COCH₂CH₂N(CH₃)(CH₃) | 164–165 |
| 47 | do | CH₃SO₂NH–[phenyl]–COCH₂CH₂N(CH₃)(CH₃) | 188–190 |

¹ Decomposition.

This phenyl-hydrazine is produced from 4-methyl-3,5-difluoroaniline by reduction of the diazonium compound thereof with sodium sulfite. The aforesaid aniline is produced from 2-fluoro-4-amino-toluene (F. C. Schmelkes, A. Soc. 66, 1631) by nitration in sulfuric acid solution, acetylation of the so-formed 2-fluoro-4-amino-6-nitro-toluene with acetyl chloride, reduction thereof with iron powder in weak acid solution to get the 2-fluoro-4-acetyl-amino-6-amino-toluene, treatment of the diazonium compound thereof with boron-trifluoride (G. S. Schiemann J. pr. Ch. 140, 97, 1934) to produce the 2,6-difluoro-4-acetylamino-toluene and hydrolysis of the acetyl-amino-group with boiling hydrochloric acid.

EXAMPLE 48

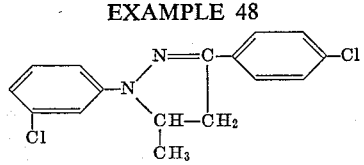

12 g. of 3-chlorophenyl hydrazine hydrochloride and 12 g. of p-chlorophenyl-1-propenyl ketone are refluxed for 3 hours while stirring in 150 ml. of ethanol. On cooling, the reaction product separates in the form of cream-colored lamellae. It is filtered, washed with water and recrystallized from ethanol. The 1-(3'-chlorophenyl)-3-

(4″-chlorophenyl)-5-methyl pyrazoline thus obtained forms faintly yellow crystals melting at 117 to 118° and having a blue fluorescence in ultraviolet light.

The compound dissolves in ethyl acetate with a deep blue-violet fluoroescence. It can be used to brighten polyamide fibers.

When in this example the 12 g. of p-chlorophenyl-1-propenyl-ketone are replaced by 13 g. of p-chlorophenyl-1-butenyl-keone, 1-(3′-chlorophenyl)-3-(4″-chlorophenyl)-5-ethyl-pyrazoline is obtained which has very similar properties as the above-described 5-methyl derivative.

EXAMPLE 49

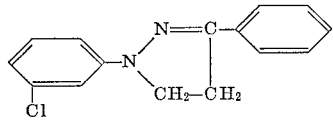

19.7 g. of 3-chlorophenyl-hydrazine hydrochloride, 17.0 g. of β-chloropropiophenone and 16 g. of pyridine are added to 140 ml. of methanol. The mixture is refluxed for 2 hours. After cooling, the precipitate formed is separated by filtration, washed with a small amount of cold methanol and finally dried.

22 g. of 1-(3′-chlorophenyl)-3-phenyl-pyrazoline are obtained as almost colorless needles having a melting point of 102° (uncorrected). Thus the yield is 86% of the theory (based on the initial amount of 3-chlorophenyl hydrazine hydrochloride). By recrystallization from ethanol the product is obtained analytically pure as clear white needles of blue fluorescence. A solution of this pyrazoline in toluene has a vivid violet fluorescence in day light. This compound is equally valuable as an optical brightening agent for synthetic polyamide fibers.

EXAMPLE 50

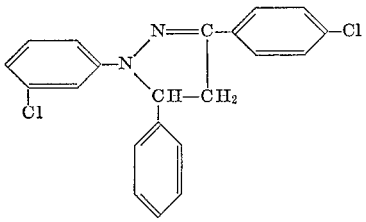

10 g. of 3-chlorophenyl-hydrazine hydrochloride and 12.2 g. of benzal-4-chloroacetophenone are refluxed for 10 hours while stirring in 120 ml. of ethanol. The reaction product separates as an almost colorless precipitate. After cooling, the product is filtered off, washed with ethanol and recrystallized from a mixture of 50 ml. of chlorobenzene and 100 ml. of ethanol. The 1-(3′-chlorophenyl)-3-(4″-chlorophenyl)-5-phenyl-pyrazoline purified in this way forms colorless crystals of blue fluorescence in the ultraviolet light which have a melting point of 121 to 122°. The yield is 14.8 g.

The new compound dissolves in ethyl acetate with a deep blue-violet fluorescence. The product can be used to brighten polyamide fibers.

When in this example the 12.2 g. of benzal-4-chloroacetophenone are replaced by 13.8 g. of 4-chlorobenzal-4′-chloroacetophenone or by 11.6 g. of (β-furyl-(2)-vinyl)-(4′-chlorophenyl)-ketone, 17.5 g. of 1-(3′-chlorophenyl)-3,5-bis-(4″-chlorophenyl)-pyrazoline (melting point 135°) and 13.8 g. of 1-(3′-chlorophenyl)-3-(4″-chlorophenyl)-5-furyl-(2′)-pyrazoline (melting point 131 to 132°), respectively, are obtained. These products have similar properties as the above described 1-(3′-chlorophenyl)-3-(4″-chlorophenyl)-5-phenyl-pyrazoline.

EXAMPLE 51

At a temperature of 50°, 100 g. of polyacrylonitrile yarn are introduced into a bath consisting of 3000 ml. of water, 1 g. of the condensation product of 1 ml. of stearyl alcohol with 22 mols of ethylene oxide, 3 g. of 85% formic acid and 0.1 g. of 1(3′-chlorophenyl)-3-(4″-chlorophenyl)-pyrazoline. The bath is heated for 15 minutes to 100° and the yarn is left for 30 minutes at 100° in the circulating liquor. Then the yarn is thoroughly rinsed with cold water, centrifuged and dried at 50 to 60°.

The treated fiber material has a pleasant white appearance.

When the above-described brightening agent is replaced by 1-(3′-bromophenyl)-3-(4″-chlorophenyl)-pyrazoline while all the other conditions remain unchanged, similar brightening effects are obtained in the fiber material mentioned.

A polyacrylonitrile fabric such as Orlon (Du Pont de Nemours, Wilmington, Del.) is impregnated on a padding machine with a liquor containing 1 g. of 1-(3′-chlorophenyl)-3-(4″-chlorophenyl)-pyrazoline, 10 g. of aqueous 80%-acetic acid and 2 g. of the condensation product of 1 mol of N-stearyl ethylene diamine with 1 mol of styrene oxide and 90 mol of ethylene oxide, in 1000 ml. of water of 30°. The fabric is squeezed to a moisture content of about 60%, rolled up and steamed for 4 hours in a pad-roll apparatus at 95°. Then it is washed on a full-width washing machine first with warm water of 50° and then with cold water, whereupon it is dried. A fabric is obtained which has a beautiful white appearance.

Similar brightening effects are obtained when the above brightening agent is replaced by 1-(3′-fluorophenyl)-3-(4″-chlorophenyl)-pyrazoline, 1-(3′ chlorophenyl)-3-(2″,5″-dimethoxyphenyl)-pyrazoline or 1-(3′trifluoromethylphenyl)-3-(4″-chlorophenyl)-pyrazoline, while all other conditions remain unchanged.

EXAMPLE 53

10 g. of a weakly yellow staple fiber fabric of nylon (as made by E. I. du Pont de Nemours, Wilmington, Del.) are treated for 30 minutes at 75° in a bath (ratio 1:40) containing 0.01 g. of 1-(3′-chlorophenyl)-3-phenyl-pyrazoline and 0.2 g. of an oleyl alcohol pentadeca-glycol ether. Then they are rinsed and dried. The nylon fabric treated in this way has a much whiter appearance in day light than an untreated fabric of the same type.

EXAMPLE 54

10 g. of undyed acetyl cellulose yarn are treated for 30 minutes at 75° in a bath (ratio 1:30) containing 0.01 of 1-(3′-chlorophenyl)-3-(4″-chlorophenyl)-pyrazoline in finely dispersed form. After rinsing and drying, the yarn treated in this way has a considerably whiter appearance than before the treatment.

EXAMPLE 55

0.2 g. of 1-(3′-bromophenyl)-3-(4″-chlorophenyl)-pyrazoline, 5 g. of titanium dioxide (anatase), 75 g. of cellulose acetate and 25 g. of diethyl phthalate are homogenized in 900 g. of acetone to form a turbid solution which is poured onto glass plates. After evaporation of the acetone, a peelable opaque film is obtained which shows a much clearer white than a comparative sample prepared without brightening agent.

EXAMPLE 56

A dry mixture of 100 g. of high pressure polyethylene in granular form and 0.006 g. of 1-(3′-chlorophenyl)-3-(4″-chlorophenyl)-pyrazoline is prepared at room temperature and then at 120 to 130° formed into a hose on the extruder. The hose obtained has a blue-violet fluorescence in day light and a markedly higher degree of whiteness than a product prepared without a brightening agent.

EXAMPLE 57

0.05 g. of 1-(3′-chlorophenyl)-3-(4″-chlorophenyl)-pyrazoline together with a mixture consisting of 67 g. of polyvinyl chloride powder, 33 g. of dioctyl phthalate, 2 g. of di-n-butyl dilauryl dioxystannate and 0.3 g. of sodium pentaoctyl tripolyphosphate are gelatinized for 15 minutes at a temperature of 160° on mixing rolls and then drawn into sheets. The polyvinyl chloride sheets produced in this way show a clearly whiter appearance than corresponding sheets produced without the addition of this brightening agent.

0.08 g. of 1-(3'-bromophenyl)-3-phenyl-pyrazoline and 7 g. of titanium dioxide (anatase) together with 67 g. of polyvinyl chloride, 33 g. of dioctyl phthalate, 2 g. of dibutyl-tindilaurate and 0.3 g. of sodium pentaoctyl tripolyphosphate are worked, as described above, into an opaque sheet. The sheet produced in this way has a much whiter appearance than a comparison sample prepared without brightening agent.

EXAMPLE 58

200 g. of soap powder and 0.2 g. of 1-(3'-chlorophenyl)-3-phenyl pyrazoline together with 400 ml. of water are worked at 80° into a homogeneous mass and then dried at 70–80° in vacuo. A clearly brightened soap material is obtained which in any conventional manner can be formed into pieces or ground to a powder.

EXAMPLE 59

To produce a light duty detergent, a slurry is prepared from:

20 g. of sodium dodecyl-benzene sulfonate,
8 g. of sodium salt of lauryl sulfate and
80 g. of water, then, at a temperature of 60 to 70°,
0.1 g. of 1-(3'-chlorophenyl)-3-(2'',5''-dimethoxyphenyl)-pyrazoline is admixed therewith, and after the addition of
2 g. of lauric acid monoethanol amide,
8 g. of sodium tripolyphosphate,
1.5 g. of carboxymethyl cellulose and
60.5 g. of sodium sulfate, the whole mixture is worked into a homogeneous mass, dried and pulverized.

When 10 g. of white nylon laundry are washed for 15 minutes at 35° in 200 g. of an aqueous wash liquor containing 1.0 g. of the above-described mild detergent, and are then rinsed and dried, the washed goods have a markedly whiter appearance than similar nylon goods washed in the same way with an analogously composed mild detergent which does not contain a brightening agent.

White cellulose acetate fabrics or knit goods can be washed and optically brightened in the same way.

EXAMPLE 60

100 g. of a heavy-duty non-soap detergent of the Syndet type consisting of 15.2 g. of dodecyl benzene sulfonate,
3.8 g. of sodium lauryl sulfate,
25.6 g. of sodium tripolyphosphate,
7.6 g. of tetrasodium pyrophosphate,
4.8 g. of sodium silicate,
1.9 g. of magnesium silicate,
5.0 g. of sodium carbonate,
1.4 g. of carboxymethylcellulose,
0.3 g. of tetrasodium salt of ethylene diamine tetraacetic acid, and
34.4 g. of sodium sulfate are mixed with 100 g. of water to form a homogeneous slurry. To this mixture are added 0.1 g. of 4,4'-bis[4'',6''-diphenylamino-1'',3'',5''-triazinyl-(2'')-amino] - stilbene-2,2'-disulfonic acid and 0.05 g. of 1-(3'-fluorophenyl)-3-(4''-chlorophenyl)-pyrazoline, the whole is mixed well and then dried in the spray tower, 100 g. of laundry consisting of 30 g. of undyed nylon fabric and 70 g. of undyed cotton fabric are washed for 10 minutes at 85° in a wash liquor containing 8 g. of the above-described brightening detergent and having a bath ratio of 1:10. Then the goods are rinsed and dried. This washing process yields a beautiful brightening effect in both types of fabric.

EXAMPLE 61

A non-ionogenic detergent is prepared by thorough mixing of the following components:

11 g. of nonylphenylpolyglycol ether having 15 ethyleneoxy groups,
11 g. of water,
33 g. of sodium tripolyphosphate,
11 g. of sodium pyrophosphate,
10 g. of sodium silicate,
20 g. of sodium sulfate,
2 g. of sodium carbonate,
2 g. of carboxymethylcellulose,
0.2 g. of 1-(3'-chlorophenyl)-3-(4''-chlorophenyl)-pyrazoline.

When white men's shirts of ladder-proof nylon tricot are washed for 20 minutes at 40° at a bath ratio of 1:15 in a wash liquor containing 5 g. per liter of this detergent, and then are rinsed and dried, the shirts washed in this manner have a brilliant white appearance.

EXAMPLE 62

To a detergent composition liquifiable at high temperatures and composed of 40 g. of sodium soap based on lauric, myristic and palmitic acid,
31 g. of sodium phosphate,
9 g. of sodium pyrophosphate,
6 g. of sodium silicate,
3 g. of magnesium silicate,
0.5 g. of tetrasodium salt of ethylene diamine tetraacetic acid,
5 g. of sodium carbonate,
5.5 g. of sodium sulfate and
70 g. of water are added at 85 to 90° with
0.1 g. of the sodium salt of 4,4'-bis-[4''-phenylamine-6''-(N - methylethanolamino) - 1'',3'',5'' - triazinyl - (2'')-amino]-stilbene-2,2'-disulfonic acid and
0.06 g. of 1 - (3'-chlorophenyl)-3-(4''-chlorophenyl)-pyrazoline.

The components are thoroughly mixed and then dried in the spray tower. A spreadable detergent is obtained.

When 100 g. of undyed mixed polyamide cotton fabric are washed in a bath ratio of 1:20 for 20 minutes in a 60° warm wash liquor containing 16 g. of the above-described detergent and are then rinsed and dried, the washed mixed fabric has a brilliant white appearance in day light.

EXAMPLE 63

The following detergent components, 21.4 g. of dodecyl benzene sulfonate,
32.6 g. of sodium tripolyphosphate,
1.1 g. of sodium carbonate,
4.5 g. of sodium silicate,
19.2 g. of sodium sulfate, and
75 g. of water are worked into a homogeneous mass at 80°. After addition of 0.15 g. of the sodium salt of 4,4'-bis-[4''-phenylamino - 6'' - (β - methoxyethylamino) - 1'',3'',5'' - triazinyl-(2'')-amino]-stilbene-2,2'-disulfonic acid and 0.05 g. of 1-(3'-fluorophenyl)-3-(4''-chlorophenyl)-pyrazoline, the whole is mixed well and dried in the spray tower. The resulting powder is then mixed with 12.7 g. of sodium perborate.

50 g. of laundry consisting of 10 g. of undyed polycaprolactam fabric and 40 g. of undyed cotton fabric are washed for 30 minutes at 35° with a solution of 5 g. of the above-described detergent in 1000 ml. of water. Then they are rinsed and dried. A brilliant white effect is obtained on the laundered fabrics.

EXAMPLE 64

100 g. of underwear made of undyed cellulose acetate tricot are washed for 15 minutes at 30 to 35° at a bath ratio of 1:15 in a wash liquor containing 0.75 g. of nonylphenol polyglycol ether, 2 g. of sodium tripolyphosphate, 1 g. of sodium pyrophosphate, 1.5 g. of Glauber salt and 0.01 g. of (1 - 3'-bromophenyl)-3-(4''-bromophenyl)-pyrazoline. Then they are rinsed and dried. The fabric treated in this way has a much more brilliant appearance than cellulose acetate laundry washed without an addition of brightening agent.

EXAMPLE 65

A heavy duty detergent mixture consisting of

| | Parts |
|---|---|
| Dodecyl benzene sulfonate | 15.2 |
| Lauryl sulfate | 3.8 |
| Sodium tripolyphosphate | 25.6 |
| Tetrasodium pyrophosphate | 7.6 |
| Anhydrous sodium silicate | 4.8 |
| Magnesium silicate | 1.9 |
| Sodium carbonate | 5.0 |
| Carboxymethyl cellulose | 1.4 |
| Sodium ethylenediamine tetraacetate | 0.3 |
| Sodium sulfate, anyhdrous | 24.0 |
| Water of crystallization | 10.4 | is mixed with 0.5 part of 1-(3'-chlorophenyl)-3-(4''-chlorophenyl)-pyrazoline in the following manner:

The brightening agent is first thoroughly mixed with 10 parts by volume of normal sodium hydroxide solution and then aftera ddition of 250 parts by volume of water, worked together with the hevay duty detergent mentioned (200 parts) into a homogeneous smooth slurry. The paste obtained is dried for 10 hours as 100° and then crushed. The washing powder obtained is homogeneously mixed in the dry state with 10 parts of sodium perborate. A perborate washing powder is obtained which has a beautiful white effect. This white effect is maintained even when this mixture is stored with a water content of 5% for 14 hours at 35 to 40° C. (95 to 104° F.).

EXAMPLE 66

26 g. of 1-(3'-chlorophenyl)-3-phenyl-pyrazoline and 30 g. of 1-(3'-chlorophenyl)-3-(4''-chlorophenyl)-pyrazoline are well mixed and the mixture is heated to 100°. A yellow homogeneous melt is obtained which solidifies into a pale yellow crystal mass on cooling. The product, which melts at 85–90°, has a crystal structure different from that of the starting components and can also be used for the brightening of polyamide fibres. Material brightened therewith has a less blue-greenish white effect than a comparative sample brightened with 1-(3'-chlorophenyl)-3-(4''-chlorophenyl)-pyrazoline.

EXAMPLE 67

30 g. of 1-(3'-chlorophenyl)-3-phenyl-pyrazoline and 20 g. of 1-(3'-chlorophenyl)-3-(4''-chlorophenyl)-pyrazoline are dissolved in 1250 ml. of ethanol and the solution is left to cool. The product which crystallises out in almost colourless white needles melts at 80–83° and, in addition to pure crystals of 1-(3'-chlorophenyl)-3-phenyl-pyrazoline, it contains a crystal compound consisting of both components. This crystal compound has the same structure as that obtained according to Example 66. The product dissolves better in organic solvents than the individual components and is also suitable for the optical brightening of polyamide substrata.

A mixed brightener of similar highly satisfactory whitening properties is obtained by mixing 45 g. of 1-(3'-chlorophenyl)-3-(4''-chlorophenyl)-pyrazoline and 55 g. of 1-(3'-chlorophenyl)-3-phenyl-pyrazoline, both in the form of fine powders, intimately with each other in a mixing drum.

For use in bleaching liquors, the mixed brightener can be dissolved in Cellosolve in a weight-to-volume ratio of e.g., 1:10, 1:100 or 1:1000.

EXAMPLE 68

240 g. of sodium carbonate are added to 197 g. of 3-chlorophenyl hydrazine hydrochloride, 750 ml. of butanol and 1000 ml. of water and the whole is heated to 90°. A solution consisting of 125 g. of ($\beta$-dimethylamino-ethyl)-(4-chlorophenyl)-ketone hydrochloride, 107 g. of ($\beta$-dimethylamino-ethyl)-phenyl ketone hydrochloride and 1000 ml. of water is added dropwise to this mixture within 1 hour at 90–95° and then the whole is refluxed for 12 hours while stirring. The brownish butanol solution is removed from the aqueous phase and allowed to cool. Pale yellowish crystals separate out which are filtered off, washed with methanol and dried at 70°.

The product has similar properties to that produced according to Example 66.

EXAMPLE 69

A light duty detergent is produced by stirring 20 g. of sodium dodecyl benzene sulfonate and 8 g. of sodium lauryl sulfate in 80 g. of water, 0.06 g. of 1-(3'-chlorophenyl)-3-phenyl pyrazoline and 0.05 g. of 1-(3'-chlorophenyl)-3-(4''-chlorophenyl)-pyrazoline are added and the whole is worked into a homogeneous mass at 60–70°. 2 g. of lauric acid monoethanolamide, 8 g. of sodium tripolyphosphate, 1.5 g. of carboxymethyl cellulose and 60.49 g. of sodium sulfate are added to the mixture, the components are well mixed, the mixture is dried and the particle size is made smaller.

Instead of the above mechanical mixture of 0.06 g. of 1-(3'-chlorophenyl)-3-phenyl-pyrazoline and 0.05 g. of 1-(3'-chlorophenyl)-3-(4''-chlorophenyl)-pyrazoline, also 0.11 g. of the brightening mixture produced according to Examples 66, 67 or 68 can be used.

If 10 g. of white nylon are washed for 15 minutes at 35° in 200 g. of an aqueous washing liquor which contains 1.0 g. of the light duty detergent described above, than rinsed and dried, the nylon so washed has a considerably more white appearance than similar nylon which has been washed in the same way with a light duty detergent of analogous composition but which does not contain the brightening mixture.

EXAMPLE 70

26 g. of 1-(3'-chlorophenyl)-3-phenyl-pyrazoline and 32 g. of 1 - (4' - methoxycarbonyl-phenyl)-3-(4''-chlorophenyl)-pyrazoline are well mixed and the mixture heated to 160°. A deep yellow homogeneous melt is obtained which solidifies into a light yellow crystal mass on cooling. The mixed brightener thus obtained melts at about 120°.

By repeating this example, but using each of the compounds listed in columns 1 and 2 of the following Table I in the given amounts instead of the two above mentioned optical brighteners, there are obtained mixed brighteners with the melting points given in column 3.

TABLE I

| Example No. | 1 | 2 | M.P., ° |
|---|---|---|---|
| 71 | 26 grams: [structure with Cl-phenyl-N-N=C-phenyl pyrazoline] | 34 grams: [NH$_2$SO$_2$-phenyl-N-N=C-phenyl-Cl pyrazoline] | 130 |

TABLE I—Continued

| Example No. | 1 | 2 | M.P., ° |
|---|---|---|---|
| 72 | 29 grams: 1-(3'-chlorophenyl)-3-(4''-chlorophenyl)-pyrazoline | 33.5 grams: 1-(4'-methylsulfonylphenyl)-3-(4''-chlorophenyl)-pyrazoline | 130 |
| 73 | 29 grams: 1-(3'-chlorophenyl)-3-(4''-chlorophenyl)-pyrazoline | 32 grams: 1-(4'-methoxycarbonylphenyl)-3-(4''-chlorophenyl)-pyrazoline | 130 |
| 74 | 29 grams: 1-(3'-chlorophenyl)-3-(4''-chlorophenyl)-pyrazoline | 34 grams: 1-(4'-sulfamoylphenyl)-3-(4''-chlorophenyl)-pyrazoline | 150 |

EXAMPLE 75

26 g. of 1-(3'-chlorophenyl)-3-phenyl-pyrazoline and 32 g. of 1-(4'-methoxycarbonyl - phenyl)-3-(4''-chlorophenyl)-pyrazoline are dissolved in 300 ml. of ethyleneglycol monomethyl ether and the solution is left to cool. The mixed brightener which crystallizes in the form of light yellow prismatic needles melts at about 120°.

By repeating the procedure of this example, but using instead of the two optical brighteners mentioned each of the compounds listed in columns 1 and 2 of the preceeding Table I in the given amounts there are obtained mixed brighteners with the melting points given in column 3 of that table.

EXAMPLE 76

A mixture of 90 g. of 3-chlorophenylhydrazine hydrochloride, 101 g. of 4-methoxycarbonyl-phenylhydrazine hydrochloride and 169 g. of β-chloropropiophenone to which 160 ml. of pyridine has been added are heated for two hours under reflux in 2500 ml. of boiling methanol. After cooling, yellow crystals are formed, which are separated by filtration, washed with ethanol and dried at 70°. The thus obtained mixed brightener melts at about 120°.

By repeating the procedure of this example, but using, instead of the above reaction components, the compounds of columns 1, 2 and 3 of the following Table II in the given amounts, there are obtained mixtures with the melting points given in the last column of the table.

EXAMPLE 81

100 g. of yarn consisting of Courtelle-type polyacrylonitrile fiber of a polymerization degree of about 35,000 and containing about 154 carboxyl groups and no sulfo groups per 100 grams of polyamid are introduced at 50° into a bath consisting of 3000 ml. of water, 1 g. of the condensation product of 1 mol of stearyl alcohol and 22 mol of ethylene oxide, 3 g. of 85% formic acid and 0.1 g. of a mixed brightener, consisting of 1-(3'-chlorophenyl-3-(4''-chlorophenyl)-pyrazoline and 1-(4''-methylsulfonylphenyl)-3-(4''chlorophenyl)-pyrazoline, in a weight ratio of 1:1. The bath is heated to 100° within 15 minutes and the yarn is left in the circulating liquor for 30 minutes at 100°. The yarn is then well rinsed with cold water, centrifuged and dried at 50–60°.

The treated fibers have a pleasant, white appearance.

If instead of the mixed brightener mentioned above, there is used the same amount of is mixed brightener consisting of 1-(3'-bromophenyl)-3-(4''-chlorophenyl)-pyrazoline and 1-(4'-methylsulfonylphenyl)-3-(4''chlorophenyl)-pyrazoline in a weight ratio of 1:1, and otherwise the procedure described in the above example is followed, then similar brightening effects are obtained on the fibers mentioned.

EXAMPLE 82

A fabric of Orlon 42 type polyacrylonitrile having a polymerization degree of about 35,000 and containing

TABLE II

| Example No. | 1 | 2 | 3 | M.P., ° |
|---|---|---|---|---|
| 77 | 90 grams: 3-Cl-C$_6$H$_4$-NHNH$_2$·HCl | 112 grams: NH$_2$SO$_2$-C$_6$H$_4$-NHNH$_2$·HCl | 169 grams: ClCH$_2$CH$_2$CO-C$_6$H$_5$ | 150 |
| 78 | 90 grams: 3-Cl-C$_6$H$_4$-NHNH$_2$·HCl | 111 grams: CH$_3$SO$_2$-C$_6$H$_4$-NHNH$_2$·HCl | 203 grams: ClCH$_2$CH$_2$CO-C$_6$H$_4$-Cl | 130 |
| 79 | 90 grams: 3-Cl-C$_6$H$_4$-NHNH$_2$·HCl | 101 grams: CH$_3$OOC-C$_6$H$_4$-NHNH$_2$·HCl | 203 grams: CH$_2$CH$_2$CO-C$_6$H$_4$-Cl | 130 |
| 80 | 90 grams: 3-Cl-C$_6$H$_4$-NHNH$_2$·HCl | 112 grams: NH$_2$SO$_2$-C$_6$H$_4$-NHNH$_2$·HCl | 203 grams: ClCH$_2$CH$_2$CO-C$_6$H$_4$-Cl | 150 | about 46 millimole of sulfogroups and 17 millimol of carboxyl groups per 100 gram of polymer is impregnated in a padding machine with a liquor containing 1 g. of a mixed brightener consisting of 1-(3'-chlorophenyl)-3-(4''-chlorophenyl)-pyrazoline and 1-(4'-sulfamoylphenyl)-3-(4''-chlorophenyl)-pyrazoline (weight ratio 1:1), 10 g. of 80% acetic acid and 2 g. of condensation product of 1 mol of N-stenryl-ethylene-diamine with 2 mol of styrene oxide and 90 mol of ethylene oxide in 1000 ml. of 30° warm water. The fabric is squeezed out to a moisture content of about 60%, rolled up and steamed in a pad-roll apparatus for 4 hours at 95°. Afterwards it is rinsed on a full width washing machine first with 50° warm and then with cold water and dried. A fabric having a beautiful white appearance is obtained.

Similar brightening effects are attained by employing in an equal amount, instead of the mixed brightener described above, mixed brighteners are obtained which contain in a 1:1 weight ratio 1-(3'-fluorophenyl)-3-(4''-chlorophenyl)-pyrazoline, 1-(3'-chlorophenyl)-3-(2'', 5''-dimethoxyphenyl)-pyrazoline or 1-(3'-trifluoromethylphenyl)-3-(4''-chlorophenyl)-pyrazoline in mixture with the second compound used above, and otherwise following the procedue described in the above example.

EXAMPLE 83

Similar good brightening effects are also obtained, when a fabric of acid-groups containing acyclic fiber tissue as used in Example B, is padded in the manner described in Example 70 with the liquor used in the said example, the fabric is squeezed off to retain liquor in an amount of 10% of the dry weight of the fabric, rinsing the impregnated fabric on an open width washing machine successively with aqueous 0.4%-formic acid of 95°, then with hot water of 50°, and with cold water followed by centrifuging and drying at 50–60°.

A brilliant white fabric of faintly violet fluorescence is obtained.

EXAMPLES 84–88

Similar good results are obtained by repeating Example 81, but employing in lieu of the mixed brightener used therein, the same amount of one of the mixed brighteners given in the table below:

TABLE III

Mixed Brightener

| Example No.: | |
|---|---|
| 84 | 50% 1-(3'-chlorophenyl)-3-phenyl-pyrazoline. |
|  | 50% 1-(4'-ethylsulfonylphenyl)-3-(4''-bromophenyl)-pyrazoline. |
| 85 | 50% 1-(3'-chlorophenyl)-3-(4''-methylphenyl)-pyrazoline. |
|  | 50% 1-(4'-ethylsulfonylphenyl)-3-(4''-chlorophenyl)-pyrazoline. |
| 86 | 50% 1-(3'-chlorophenyl)-3-(4''-chlorophenyl)-pyrazoline. |
|  | 50% 1-(4'-sulfamoylphenyl)-3-phenyl-pyrazoline. |
| 87 | 60% 1-(4'-chlorophenyl)-3-phenyl-pyrazoline. |
|  | 40% 1-[4'-(β-dimethylaminoethoxy)-carbonyl-phenyl]-3-(4''-chlorophenyl)-pyrazoline. |
| 88 | 60% 1-(4'-chlorophenyl)-3-phenyl-pyrazoline. |
|  | 40% 1-[4'-(β-N-pyrrolidino-ethoxy)-carbonyl-phenyl]-3-(4''-chlorophenyl)-pyrazoline. |

EXAMPLE 89

50 kg. of polyacrylonitrile material are introduced into an chlorite bleaching bath containing 2 g. per liter of sodium chlorite (80% weight content of NaClO) and 2 g. per liter of oxalic acid and having a temperature of 80°. After 10 minutes reaction time the temperature is raised to 85° and the material bleached for a further 40 minutes at that temperature. Then 5 ml. per liter of 30%-hydrogen peroxide are added to the bath and the treatment is continued for 15 more minutes. The bath is then cooled to 60° and 50 g. (0.1% by weight based on the weight of the polyacrylonitrile material) of mixed optical brightener in finely dispersed form, consisting of 1 part of 1-(3'-fluorophenyl)-3-phenyl-pyrazoline and 1 part of 1 - [4' - carbo-(β-N,N-dimethylamino-ethoxy)-phenyl]-3-(4'' - chlorophenyl) - pyrazoline, is added. In order to achieve dispersion of the only very slightly soluble optical brightener, 500 g. of nonylphenolpolyglycol-ether (1% by weight calculated on the weight of the polyacrylonitrile material) is added to the bath.

After 15 minutes circulation at 60° the temperature is raised to 95° within 30 minutes and held at that temperature for a further 45 minutes. Then the bath is cooled to 60° and the liquor is drained off. The polyacrylonitrile material is rinsed, squeezed and dried. Similar bleaching effects are obtained by employing the same procedure as in the above example, but using in the same amount a mixed brightener which consists of 4 parts of 1-(3'-chlorophenyl)-3-(4'' - chlorophenyl) - pyrazoline and 6 parts of 1 - (4'-sulfamoyl-phenyl)-3-(4''-chlorophenyl)-pyrazoline.

EXAMPLE 90

1500 liter of a chlorite bleaching bath containing 2 g. per liter of sodium chlorite (80%) and 2 per liter of oxalic acid are prepared in a stainless steel winch vat. 50 kg. of nylon staple fiber fabric are introduced into the bath at 50°, the temperature of the bath is raised to 85° within 20 minutes and the material is bleached for a further 20 minutes at this temperature. Then 3 ml. per liter of 30% hydrogen peroxide is added to the bath and the fiber material is treated for a further 15 minutes. Heating is then interrupted and 50 grams (0.1% calculated on the weight of the material) of a mixed brightener consisting of 6 parts of 1-(3'-chlorophenyl)-3-(4''-methoxyphenyl)-pyrazoline and 4 parts of 1-(4'-methoxycarbonylphenyl) - 3 - (4''-chlorophenyl)-pyrazoline in finely dispersed form are added in several batches over a period of 15 minutes. In order to ensure the dispersion of the only very slightly soluble brightener, 500 grams (1% calculated on the weight of the material) of the same dispersing agent as used in Example 20 are added to the liquor shortly prior to the addition of the brightener. After the addition of the brightener is complete the temperature of the bath is raised to 90° and maintained at this level for 45 minutes. Then the bath is cooled to 40° and drained. The material is then rinsed in the winch vat, squeezed and dried. A well brightened nylon staple fiber fabric is thus obtained.

A similar brightening effect is obtained on the same type of textile material by employing instead of the mixed brightener used in this example, the same amount of a mixed brightener consisting of 1 part of 1-(3'-chlorophenyl)-3-(4''-fluorophenyl)-pyrazoline and 1 part of 1-(4' - sulfamoyl - phenyl)-3-(4''-chlorophenyl)-pyrazoline.

EXAMPLE 91

10 g. of a weakly yellow nylon staple fiber fabric are treated for 30 minutes at 75° in a bath (ratio 1:40) containing 0.006 g. of 1 - (3' - chlorophenyl) - 3 - phenyl-pyrazoline and 0.004 g. of 1-(4'-methoxycarbonyl)-3-(4''-chlorophenyl)-pyrrazoline, as well as 0.2 g. of oleyl alcohol pentadeca-glycol ether. The fabric is then rinsed and dried. The nylon fabric thus treated has a much whiter appearance in daylight than an untreated fabric of the same type.

EXAMPLE 92

10 g. of undyed cellulose 2½-acetate yarn are treated for 30 minutes at 75° in a bath (ratio 1:30) containing 0.006 g. of 1 - (3'-chlorophenyl)-3-(4''-chlorophenyl)-pyrazoline and 0.006 g. of 1-(4'-ethoxycarbonyl-phenyl)-

3-(4″-chlorophenyl)-pyrazoline in finely dispersed form. After rinsing and drying, the yarn treated in this way has a considerably whiter appearance than before the treatment.

EXAMPLE 93

0.2 g. of 1-(3′-bromophenyl)-3-(4″-chlorophenyl)-pyrazoline, 0.1 g. of 1-(4′-methoxycarbonyl-phenyl)-3-(4″-chlorophenyl)-pyrazoline, 5 g. of titanium dioxide (anatase), 75 g. of cellulose 2½-acetate and 25 g. of diethyl phthalate are homogenized in 900 g. of acetone to form a turbid solution which is poured onto glass plates. After evaporation of the acetone, a peelable opaque film is obtained which shows a much clearer white than a comparative sample prepared without brightening agent.

EXAMPLE 94

A dry mixture of 100 g. of high pressure polyethylene in granular form and 0.006 g. of a mixed brightener consisting of 1 - (3′ - chlorophenyl) - 3-(3″-chlorophenyl)-pyrazoline and 1 - (4″ - ehtoxycarbonyl-phenyl)-3-(3″-chlorophenyl-pyrazoline (weight ratio 1:1) is prepared at room temperature and then at 120 to 130° formed into a hose on the extruder. The hose obtained has a blue-violet fluorescence in day light and a markedly higher degree of whiteness than a product prepared without a brightening agent.

EXAMPLE 95

A mixed brightener consisting of 0.05 g. of 1-(3′-chlorophenyl) - 3 - (4″ - chlorophenyl)-pyrazoline and 0.03 g. of 1 - (4′ - ethoxycarbonyl)-3-phenyl-pyrazoline together with a mixture consisting of 67 g. of polyvinyl chloride powder, 33 g. of dioctyl phthalate, 2 g. of di-n-butyl dilauryl dioxystannate and 0.3 g. of sodium pentaoctyl tripolyphosphate are gelatinized for 15 minutes at a temperature of 160° on mixing rolls and then drawn into sheets. The polyvinyl chloride sheets produced in this way show a clearly whiter appearance than corresponding sheets produced without the addition of this brightening agent.

0.08 g. of 1-(3′-bromophenyl)-3-phenyl-pyrazoline 0.04 g. of 1-(4′-methoxycarbonyl-phenyl)-3-(4″-chlorophenyl)-pyrazoline and 7 g. of titanium dioxide (anatase) together with 57 g. of polyvinyl chloride, 33 g. of dioctyl phthalate, 2 g. of dibutyl-tindilaurate and 0.3 g. of sodium pentacetyl tripolyphosphate are worked, as described above, into an opaque sheet. The sheet produced in this way has a much whiter appearance than a comparison sample prepared without brightening agent.

EXAMPLE 96

200 g. of soap powder and 0.2 g. of a mixed brightener consisting of 1 - (3′ - chlorophenyl)-3-phenyl pyrazoline and 1 - (4′ - sulfamoylphenyl) - 3 - (4″-chlorophenyl)-pyrazoline (weight ratio 1:1) as well as 400 ml. of water are worked at 80° into a homogeneous mass and then dried at 70–80° in vauco. A clearly brightened soap material is obtained which can be formed into pieces or ground to a powder in an conventional manner.

EXAMPLE 97

To produce a light duty detergent, a slurry is prepared from 20 g. of sodium dodecyl-benzene sulfonate,
8 g. of sodium salt of lauryl sulfate and
80 g. of water, then, at a temperature of 60 to 70°,
0.06 g. of 1-(3′-chlorophenyl)-3-(2″,5″-dimethoxyphenyl)-pyrazoline and
0.05 g. of 1-(4′ - methoxycarbonyl-phenyl) -3-(4″-ethoxyphenyl)-pyrazoline are mixed therewith: to the resulting mixture there are added
2 g. of lauric acid monoethanol amide,
8 g. of sodium tripolyphosphate,
1.5 g. of carboxymethyl cellulose and
60.5 g. of sodium sulfate and the whole mixture is worked into a homogeneous mass, dried and pulverized When 10 g. of white nylon laundry are washed for 15 minutes at 35° in 200 g. of an aqueous wash liquor containing 1.0 g. of the above-described mild detergent, and are then rinsed and dried, the washed goods have a markedly whiter appearance than similar nylon goods washed in the same way with an analogously composed mild detergent which does not contain a brightening agent.

White cellulose acetate fabrics or knit goods can be washed and optically brightened in the same way.

EXAMPLE 98

100 g. of a heavy-duty non soap detergent of the Syndet type consisting of 15.2 g. of dodecyl benzene sulfonate,
3.8 g. of sodium salt of lauryl alcohol sulfonic acid ester,
25.6 g. of sodium polyphosphate,
1.6 g. of tetrasodium pyrophosphate,
4.8 g. of sodium silicate,
1.9 g. of magnesium silicate,
5.0 g. of sodium carbonate,
1.4 g. of carboxymethylcellulose,
0.3 g. of tetrasodium salt of ethylene diamine tetraacetic acid, and
34.4 g. of sodium sulfate are mixed with 100 g. of water to form a homogeneous slurry. To this mixture are added 0.1 g. of 4,4′-bis[4″,6″-diphenylamino - 1″,3″,5″ - triaginyl - (2″)-amino]stilbene-2,2′-disulfonic acid, 0.05 g. of 1-(4′-methoxycarbonyl-phenyl)-3-(4″-chlorophenyl)-pyrazoline, and 0.05 g. of 1-(3′-fluorophenyl)-3-(4″-chlorophenyl)-pyrazoline, the whole is mixed well and then dried in a spray tower;

100 g. of laundry consisting of 30 g. of undyed nylon fabric and 70 g. of undyed cotton fabric are washed for 10 minutes at 85° in a wash liquor containing 8 g. of the above-described brightening detergent and having a bath ratio of 1:10. Then the goods are rinsed and dried. This washing process yields a beautiful brightening effect in both types of fabric.

EXAMPLE 99

A non-ionogenic detergent is prepared by through mixing of the following components:

11 g. of nonylphenylpolyglycol ether having 15 ethyleneoxy groups,
11 g. of water,
33 g. of sodium tripolyphosphate,
11 g. of sodium pyrophosphate,
10 g. of sodium silicate,
20 g. of sodium sulfate,
2 g. of sodium carbonate,
2 g. of carboxymethylcellulose,
0.2 g. of 1-(3′-chlorophenyl)-3-(4″-chlorophenyl)-pyrazoline,
0.2 g. of 1-(4′-methylsulfonylphenyl)-3-(4″-chlorophenyl)-pyrazoline.

When white men's shirts of ladder-proof nylon tricot are washed for 20 minutes at 40° at a bath ratio of 1:15 in a wash liquor containing 5 g. per liter of this detergent, and then are rinsed and dried, the shirts washed in this manner have a brilliant white appearance:

EXAMPLE 100

To a detergent composition liquifiable at high temperatures and composed of 40 g. of sodium soap based on lauric, myristic and palmitic acid,
31 g. of sodium phosphate,
9 g. of sodium pyrophosphate,
6 g. of sodium silicate,
3 g. of magnesium silicate, 0.5 g. of tetrasodium salt of ethylene diamine tetraacetic acid,
5 g. of sodium carbonate,
5.5 g. of sodium sulfate and
70 g. of water are added at 85 to 90° with
0.1 g. of the sodium salt of 4,4′-bis[4″-phenylamine-6″-(N-methylethanolamino) - 1″,3″,5″ - triazinyl)-(2″)-amino]-stilbene-2,2′-disulfonic acid,
0.04 g. of 1-(3′-chlorophenyl)-3-(4″-chlorophenyl)-pyrazoline and
0.06 g. of 1-(4′-sulfamoylphenyl)-3-(4″-chlorophenyl)-pyrazoline.

The components are thoroughly mixed and then dried in the spray tower. A spreadable detergent is obtained.

When 100 g. of undyed blended nylon-cotton fabric are washed at a bath ratio of 1:20 for 20 minutes in a 60° warm wash liquor containing 16 g. of the above-described detergent and are then rinsed and dried, the washed mixed fabric has a brillant white appearance in daylight.

EXAMPLE 101

The following detergent components, 21.4 g. of dodecyl benzene sulfonate,
32.6 g. of sodium tripolyphosphate,
1.1 g. of sodium carbonate,
4.5 g. of sodium silicate,
12.2 g. of sodium sulfate, and
75 g. of water are worked into a homogeneous mass at 80°. After addition of 0.15 g. of di-sodium 4,4′-bis-[4″-phenylamino-6″-($\beta$-methoxyethylamino) - 1″,3″,5″ - triazinyl - (2″)-amino]-stilbene-2,2′-disulfonate 0.05 g. of 1-(3′-chlorophenyl)-3-(4″-chlorophenyl)-pyrazoline and 0.03 g. of 1-(4′-methoxycarbonylphenyl) - 3 - (4″-chlorophenyl)-pyrazoline, the whole is mixed well and dried in a spray tower. The resulting powder is then mixed with 12.7 g. of sodium perborate.

50 g. of laundry consisting of 10 g. of undyed polycaprolactam fabric and 40 g. of undyed cotton fabric are washed for 30 minutes at 35° with a solution of 5 g. of the above-described detergent in 1000 ml. of water. Then they are rinsed and dried. A brillant white effect is obtained on the laundered fabrics.

EXAMPLE 102

A synthetic detergent, consisting of
30.3 parts of dodecylbenzene sulfonate,
7.6 parts of sodium lauryl sulfate,
51.2 parts of sodium tripolyphosphate,
15.2 parts of tetrasodium pyrophosphate,
7.6 parts of sodium silicate,
9.6 parts of sodium silicate,
10.0 parts of sodium carbonate,
2.8 parts of carboxymethyl cellulose,
0.6 parts of tetrasodium ethylenediamine tetraacetate,
48 parts of sodium sulfate and 20.8 parts of water is admixed in the manner described below with a mixed brightener consisting of 1-(3′-chlorophenyl)-3-phenyl-pyrazoline and 1-(4′-methoxycarbonylphenyl)-3-(4″-chlorophenyl)-pyrazoline in a weight ratio of 2:1.

0.3 g. of brightener mixture is first intimately mixed with 3 ml. of 1 N-sodium hydroxide solution, and then admixed with 100 g. of the above synthetic detergent and 250 ml. of water to a homogeneous paste which is then dried during 10 hours at 100° and then comminuted. The resulting dry detergent powder is mixed homogeneously with 20 g. of dry sodium perborate and a perborate-detergent of beautiful white appearance is obtained. This white appearance is also preserved when the mixture is stored, after adding 10 g. of water for 14 hours at 35–40°.

100 g. of goods consisting of 30 g. of undyed nylon fabric are washed for 10 minutes at 85° in a liquor, liquor ratio 1:10, containing 8 g. of the perborate-detergent described above. The goods are then rinsed and dried. The nylon fabric is beautifully brightened by this washing process.

EXAMPLE 103

100 g. of underwear made of undyed cellulose acetate tricot are washed for 15 minutes at 30 to 35° at a bath ratio of 1:15 in a wash liquor containing 0.75 g. of nonylphenyl polyglycol ether, 2 g. of sodium tripolyphosphate, 1 g. of sodium pyrophosphate, 1.5 g. of sodium sulfate and 0.01 g. of 1-(3′-bromophenyl)-3-phenyl-pyrazoline and 0.01 g. of 1-(4′-ethoxycarbonylphenyl)-3-(4″-chlorophenyl)-pyrazoline, in the form of a mixed brightener. Then they are rinsed and dried. The goods treated in this way have a much more brilliant appearance than cellulose acetate laundry washed without an addition of brightening agent.

EXAMPLE 104

A light duty detergent is produced by stirring 20 g. of sodium dodecyl benzene sulfonate and 8 g. of sodium lauryl sulfate in 80 g. of water, 0.1 g. of 1-(3′-chlorophenyl)-3-phenylpyrazoline and 0.05 g. of 1-(4′-methoxycarbonylphenyl) - 3 - (4″-chlorophenyl)-pyrazoline in the form of a mixed brightener are added and the whole is worked into a homogeneous mass at 60–70°. 2 g. of lauric acid monoethanolamide, 8 g. of sodium tripolyphosphate, 1.5 g. of carboxymethyl cellulose and 60.49 g. of sodium sulfate are added to the mixture, the comopnents are well mixed, the mixture is dried and comminuted.

By replacing the above mixed brightener by an equal amount of the mixed brighteners described in Examples 70 to 80, similar brightening detergent are obtained.

When 10 g. of white nylon are washed for 15 minutes at 35° in 200 g. of an aqueous washing liquor which contains 1.0 g. of the light duty detergent described above, then rinsed and dried, the nylon so washed has a considerably more white appearance than similar nylon which has been washed in the same way with a light detergent of analogous composition but which does not contain the mixed brightener.

EXAMPLE 105

To compare the brightening strength of various individual and mixed brighteners according to the invention with each other, a heavy duty detergent mixture consisting of 15.2 parts of dodecyl benzene sulfonate,
3.8 parts of lauryl sulfate,
25.6 parts of sodium tripolyphosphate,
7.6 parts of tetrasodium pyrophosphate,
4.8 parts of anhydrous sodium silicate,
1.9 parts of magnesium silicate,
5.0 parts of sodium carbonate,
1.4 parts of carboxymethyl cellulose,
0.3 part of sodium ethylenediamine tetraacetate,
24.0 parts of sodium sulfate, anhydrous,
10.4 parts of water of crystallization, tested each with one of the following brighteners (in-amounts per 1000 parts of detergent):

(A) 15.36 parts of 1-(4-′-methoxycarbonyl-phenyl)-(4″-chlorophenyl)-pyrazoline;
(B) 15.36 parts of 1-(3′-chlorophenyl)-3-(4″-chlorophenyl)-pyrazoline;
(AB) 2.88 parts of the mixed brightener consisting of 1-(4′-methoxycarbonyl - phenyl)-3-(4″-chlorophenyl)-pyrazoline mixed with 1-(3′-chlorophenyl)-3-(4″-chlorophenyl)-pyrazoline in a weight ratio of 1:2, and
(C) 21.52 parts of 1-(3′-chlorophenyl)-3-phenyl-pyrazoline;
(AC) 3.64 parts of a mixed brighetener consisting of 1 - (4′ - methoxycarbonyl-phenyl)-3-(4″-chlorophenyl)-pyrazoline and 1-(3'-chlorophenyl)-3-phenyl-pyrazoline in a weight ratio of about 1:3;

(BC) 4.8 parts of a mixed brighetener consisting of 1-(3'-chlorophenyl)-3-(4''-chlorophenyl)-pyrazoline and 1-(3'-chlorophenyl-3-phenyl-pyrazoline in a weight ratio of about 45:55. (Example 67)

A brightening wash liquor is prepared by dissolving 250 g. of the above-described heavy duty detergent in 55 liters of tap water, the amount of solution of brightener in Cellosolve given below is added, and the liquor is diluted with water to a total volume of 60 parts.

The brightener-in-Cellosolve solutions added are the following:

(a) 3.84 liters of 1:1000 solution of brightener (A) in Cellosolve, i.e. 3.84 g. of brightener (a);

(b) 3.84 liters of a 1:1000 solution of brightener (B) in Cellosolve containing a total of 3.84 g. of this brightener;

(a/b) 0.24 liter of the Cellosolve solution of (A), corresponding to a total of 0.24 g. of brightener (B), and 0.48 liter of a 1:1000 solution of brightener (B) in Cellosolve, containing a total of 0.48 g. of the latter brighener;

(c) 5.38 liters of a 1:1000 solution of brightener (C) in Cellosolve, corresponding 5.38 g. of the said brightener;

(a/c) 0.24 liter of the solution of brightener (A) as used under (a), corresponding to 0.24 g. of brightener, and 0.67 liter of a 1:1000 solution of brightener (C) in Cellosolve, corresponding to 0.67 g. of this brightener;

(b/c) 1.20 liters of a 1:1000 solution of the mixed brightener, produced as described in Example 67 in cellulose, corresponding to 1.20 g. of this mixed brightener.

Test batches of 2 kg. of spun fabric of nylon 66 staple fiber are introduced into each of the liquors (a) to (e) thus obtained, the test liquor in each case is heated up in about 30 minutes to 55°, the nylon goods are left for 15 minutes in the liquor at the latter temperature; then they are removed and rinsed with cold water and dried in air of 60°.

In each case, brightened nylon goods are obtained the whiteness of which is a neutral white free from hues, which corresponds to a value of about 96 on the Hunter scale. The amounts necessary to attain this whiteness with brighteners A, B, C, AB, AC and BC in 1000 g. of detergent (on 8 kg. of nylon 66 fabric) are shown in the diagram of the accompanying drawing. It is very surprising that similar effects are obtained on nylon with mixed brighteners (A/B), (A/C) and (B/C), in amounts which are only a fraction of the amounts of the individual brighteners (A), (B) and (C) required to obtain whiteness values of the same order.

EXAMPLE 106

60 parts of 1-(3'-chlorophenyl)-3-phenyl-pyrazoline,
20 parts of 1-(3 - chlorophenyl) - 3-(4''-chlorophenyl)-pyrazoline, and
20 parts of 1-(3'-fluorophenyl)-3-(4''-chlorophenyl)-pyrazoline are mixed intimately, in powder form, in a mixing drum. A mixed brightener of outstanding whitening properties on synthetic polyamide fibers is obtained.

EXAMPLE 107

25 parts of 1-(3'-chlorophenyl)-3-phenyl-pyrazoline,
25 parts of 1 - (3' - chlorophenyl)-3-(4''-chlorophenyl)-pyrazoline,
25 parts of 1-(3'-fluorophenyl)-3-phenyl-pyrazoline, and
25 parts of 1-(4'-methoxycarbonyl-phenyl)-3-(4''- chlorophenyl)-pyrazoline are mixed intimately with each other in powder form in a mixing drum. A mixed optical brightener of similar good properties as the brightener of the preceding example is obtained.

EXAMPLE 108

Further mixed brighteners are obtained by mixing, by the methods given in Examples 66 to 68, each of the brighteners produced as described in Examples 1 to 50 in a weight ratio of about 1:1 with one of the following compounds falling under Formula VI:

1-(4'-methoxycarbonylphenyl)-3-(3'',4''-dichlorophenyl)-pyrazoline
1-(4'-n-butoxycarbonylphenyl)-3-(4''-chlorophenyl)-pyrazoline
1-(4'-methoxycarbonylphenyl)-3-(4''-bromophenyl)-pyrazoline
1-(4'-3-hydroxyethoxycarbonyl-phenyl)-3-(4''-chlorophenyl)-pyrazoline
1-(4'-phenoxycarbonylphenyl)-3-(4''-chlorophenyl)-pyrazoline
1-(4'-cyanophenyl)-3-(4''-chlorophenyl)-pyrazoline
1-(4'-cyanophenyl)-3-(3'',4''-dimethoxyphenyl)-pyrazoline
1-(4'-β-chloroethoxycarbonyl-phenyl)-3-(4''-chlorophenyl)-pyrazoline
1-(4'-β-methoxyethoxycarbonyl-phenyl)-3-(4''-chlorophenyl)-pyrazoline
1-(4'-benzyloxycarbonylphenyl)-3-(4''-chlorophenyl)-pyrazoline
1-(4'-carbamylmethoxycarbonylphenyl)-3-(4''-chlorophenyl)-pyrazoline
1-(4'-carbamylphenyl)-3-(4''-chlorophenyl)-pyrazoline
1-(4'-methylaminocarbonylphenyl)-3-phenyl-pyrazoline
1-(4'-ethylaminocarbonylphenyl)-3-phenyl-pyrazoline
1-(4'-β-hydroxyethylaminocarbonyl-phenyl)-3-phenyl-pyrazoline
1-(4'-diethylaminocarbonylphenyl)-3-phenyl-pyrazoline
1-(4'-β-methoxyethylaminocarbonyl-phenyl)-3-phenyl-pyrazoline
1-(4'-β-ethoxyethylaminocarbonyl-phenyl)-3-(4''-chlorophenyl)-pyrazoline
1-(4'-γ-methoxypropylaminocarbonyl-phenyl)-3-phenyl-pyrazoline
1-(4'-β-dimethylaminoethylaminocarbonyl-phenyl)-3-(4''-chlorophenyl)-pyrazoline
1-(4'-N-methyl-(β-hydroxyethylamino)-carbonylphenyl)-3-phenyl-pyrazoline
1-(4'-sulfamoylphenyl)-3-(4''-chlorophenyl-5-phenyl-pyrazoline
1-(4'-dimethylaminosulfonylphenyl)-3-(4''-chlorophenyl)-pyrazoline
1-(4'-ethylaminosulfonylphenyl)-3-(4''-chlorophenyl)-pyrazoline
1-(4'-β-hydroxyethylaminosulfonyl-phenyl)-3-phenyl-pyrazoline
1-(4'-γ-dimethylaminopropylaminosulfonyl-phenyl)-3-(4''-chlorophenyl)-pyrazoline
1-(4'-phenylaminosulfonylphenyl)-3-(4''-chlorophenyl)-pyrazoline
1-(4'-trifluoromethylphenyl)-3-(4''-chlorophenyl)-pyrazoline
1-(3'-methyl-4'-sulfamoylphenyl)-3-(4''-chlorophenyl)-pyrazoline
1-(3'-methyl-4'-methylsulfonylphenyl)-3-(4''-chlorophenyl)-pyrazoline
1-(4'-sulfamoylphenyl)-3-(4''-ethoxycarbonylaminophenyl)-pyrazoline
1-(4'-methylsulfonylphenyl)-3-(4''-ethoxycarbonylaminophenyl)-pyrazoline
1-(4'-di-β-hydroxyethylaminosulfonyl-phenyl)-3-(4''-chlorophenyl)-pyrazoline
1-(4'-isopropylsulfonylphenyl)-3-(4''-chlorophenyl)-pyrazoline
1-(4'-methylsulfonylphenyl)-3-(4''-chlorophenyl)-4-methylpyrazoline 1-(4'-methylsulfonylphenyl)-3-(4''-fluorophenyl)-pyrazoline
1-(4'-methylsulfonylphenyl)-3-(4''-methoxyphenyl)-pyrazoline
1-(4'-methylsulfonylphenyl)-3-(4''-chlorophenyl)-5-phenylpyrazoline
1-(4'-chloromethylsulfonylphenyl)-3-(4''-chlorophenyl)-pyrazoline
1-(4'-methylsulfonylphenyl)-3-(4''-bromophenyl)-pyrazoline
1-(4'-ethylsulfonylphenyl)-3-(3'',4''-dichlorophenyl)-pyrazoline
1-(4'-β-dimethylaminoethylsulfonyl-phenyl)-3-(4''-chlorophenyl)-pyrazoline
1-(4'-(β-hydroxyethylsulfonyl)-phenyl)-3-(4''-chlorophenyl)-pyrazoline
1-(4'-(β-hydroxypropylsulfonyl)-phenyl)-3-(4''-chlorophenyl)-pyrazoline
1-(4'-β-methoxyethylamino-sulfonyl-phenyl)-3-(4''-chlorophenyl)-pyrazoline
1-(4'-methylsulfonylphenyl)-3-(2'',4''-dichlorophenyl)-pyrazoline
1-(4'-(p-methylphenylsulfonyl)-phenyl)-3-(4''-chlorophenyl)-pyrazoline
1-(4'-(p-chlorophenylsulfonyl)-phenyl)-3-(4''-chlorophenyl)-pyrazoline
1-(4'-(m,p-dichlorophenyl-sulfonyl)-phenyl)-3-(4''-chlorophenyl)-pyrazoline
1-(4'-(β-methoxyethylsulfonyl)-phenyl)-3-(4''-chlorophenyl)-pyrazoline
1-(4'-β-ethoxyethylamino-sulfonyl-phenyl)-3-(4''-chlorophenyl)-pyrazoline
1-(4'-(p-methylphenoxysulfonyl)-phenyl)-3-(4''-chlorophenyl)-pyrazoline
1-(4'-(p-chlorophenoxysulfonyl)-phenyl)-3-(4''-chlorophenyl)-pyrazoline
1-(4'-(p-methoxyphenylsulfonyl)-phenyl)-3-(4''-chlorophenyl)-pyrazoline
1-(4'-benzylaminosulfonylphenyl)-3-(4''-chlorophenyl)-pyrazoline
1-(4'-benzylsulfonylphenyl)-3-(4''-chlorophenyl)-pyrazoline.

New compounds from among the above enumeration are prepared by conventional methods, e.g. by condensation of a correspondingly 4-substituted phenylhydrazine with a Mannich-base or a β-chloroethyl-arylketone or a chalkone (as exemplified by Example 1).

The 1-(4'-aryloxysulfonylphenyl)-3-arylpyrazolines and the esters of the 1-(4'-hydroxycarbonylphenyl)-3-arylpyrazolines are prepared from the corresponding chlorosulfonyl- or chlorocarbonyl-substituted compounds and the hydroxy-compounds in the presence of an acid binding agent.

EXAMPLE 109

Similar good optical brighteners are obtained by mixing pairs of two compounds produced as described in Examples 1 to 50, in approximately equal amounts, within a first series, one, and, in a second series two, of the compounds falling under Formula VI listed in Example 108.

We claim:
1. A mixed optical brightener consisting essentially of a first compound 1-(3'-chlorophenyl)-3-phenyl-pyrazoline and a second compound 1-(3'-chlorophenyl)-3-(4''-chlorophenyl)-pyrazoline, the weight ratio of said first compound to said second compound being in the range of from 3:1 to 1:3.

2. A mixed optical brightener consisting essentially of a first compound 1-(3'-chlorophenyl)-3-phenyl-pyrazoline and a second compound 1-(3'-fluorophenyl)-3-(4''-chlorophenyl)-pyrazoline, the weight ratio of said first compound to said second compound being in the range of from 3:1 to 1:3.

3. A mixed optical brightener consisting essentially of a first compound 1-(3'-chlorophenyl)-3-phenyl-pyrazoline and a second compound 1-(3'-bromophenyl)-3-(4''-chlorophenyl)-pyrazoline, the weight ratio of said first compound to said second compound being in the range of from 3:1 to 1:3.

4. A mixed optical brightener consisting essentially of a first compound 1-(3'-chlorophenyl)-3-(4''-propionylaminophenyl)-pyrazoline and a second compound 1-(3'-chlorophenyl) - 3 - (4''-chlorophenyl) - pyrazoline, the weight ratio of said first compound to said second compound being in the range of from 3:1 to 1:3.

5. A mixed optical brightener consisting essentially of a first compound 1-(3'-chlorophenyl)-3-(4''-ethoxycarbonylaminophenyl)-pyrazoline and a second compound 1-(3'-chlorophenyl)-3-(4''-chlorophenyl)-pyrazoline, the weight ratio of said first compound to said second compound being in the range of from 3:1 to 1:3.

6. A mixed optical brightener consisting essentially of a first compound 1-(3'-bromophenyl)-3-(4''-chlorophenyl)-pyrazoline and a second compound 1-(3'-chlorophenyl) - 3 - (2'',5''-dimethoxyphenyl) - pyrazoline, the weight ratio of said first compound and second compound being in the range of from 3:1 to 1:3.

7. A mixed optical brightener consisting essentially of a first compound 1-(3'-chlorophenyl)-3-phenyl-pyrazoline and a second compound 1-(4'-methoxycarbonylphenyl)-3-(4''-chlorophenyl)-pyrazoline, the weight ratio of said first to said second compound being in the range of from 3:1 to 1:3.

8. A mixed optical brightener consisting essentially of a first compound 1-(3'-chlorophenyl)-3-(4''-chlorophenyl)-pyrazoline and a second compound 1-(4'-methylsulfonylphenyl)-3-(4''-chlorophenyl)-pyrazoline, the weight ratio of said first compound to said second compound being in the range of from 3:1 to 1:3.

9. A mixed optical brightener consisting essentially of a first compound 1-(3'-chlorophenyl)-3-(4''-chlorophenyl)-pyrazoline and a second compound 1-(4'-sulfamoylphenyl)-3-(4''-chlorophenyl)-pyrazoline, the weight ratio of said first compound to said second compound being in the range of from 3:1 to 1:3.

10. A mixed optical brightener consisting essentially of a first compound 1-(3'-fluorophenyl)-3-(4''-chlorophenyl)-pyrazoline and a second compound 1-(4'-sulfamoylphenyl) - 3 - (4''-chlorophenyl)-pyrazoline, the weight ratio of said first compound to said second compound being in the range of from 3:1 to 1:3.

11. A mixed optical brightener consisting essentially of a first compound 1-(3'-chlorophenyl)-3-(2'',5''-dimethoxyphenyl)-pyrazoline and a second compound 1-(4'-sulfamoylphenyl)-3-(4''-chlorophenyl-pyrazoline, the weight ratio of said first compound to said second compound being in the range of from 3:1 to 1:3.

12. A mixed optical brightener consisting essentially of a first compound 1-(3'-trifluoromethylphenyl)-3-(4''-chlorophenyl)-pyrazoline and a second compound 1-(3'-sulfamoylphenyl) - 3 - (4''-chlorophenyl)-pyrazoline, the weight ratio of said first compound to said second compound being in the range of from 3:1 ot 1:3.

References Cited
UNITED STATES PATENTS
3,132,106   5/1964   Villaume.

TOBIAS E. LEVOW, Primary Examiner

R. D. EDMONDS, Assistant Examiner

U.S. Cl. X.R.
117—33.5